United States Patent
Prechtl et al.

(10) Patent No.: US 6,850,310 B1
(45) Date of Patent: Feb. 1, 2005

(54) CHOLESTERIC LAYERED MATERIAL HAVING IMPROVED COLOR STABILITY, AND THE PRODUCTION THEREOF

(75) Inventors: Frank Prechtl, Frankfurt (DE); Norbert Schneider, Altrip (DE); Frank Meyer, Heidelberg (DE); Peter Blaschka, Ludwigshafen (DE); Sylke Haremza, Neckargemünd (DE); Tilmann Hezel, Mannheim (DE); Robert Parker, Mannheim (DE); Volker Richter, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 378 days.

(21) Appl. No.: 09/648,368

(22) Filed: Aug. 25, 2000

(30) Foreign Application Priority Data

Aug. 27, 1999 (DE) .......................... 199 40 681

(51) Int. Cl.[7] .............................................. C09K 19/02
(52) U.S. Cl. ....................................................... 349/185
(58) Field of Search .......................................... 349/185

(56) References Cited

U.S. PATENT DOCUMENTS

| | | | |
|---|---|---|---|
| 5,631,665 A | * 5/1997 | Takizawa et al. | 345/88 |
| 5,744,057 A | 4/1998 | Meyer et al. | |
| 5,780,629 A | 7/1998 | Etzbach et al. | |
| 5,788,880 A | 8/1998 | Schierlinger et al. | |
| 5,827,449 A | 10/1998 | Hanelt et al. | |
| 5,851,604 A | * 12/1998 | Muller-Rees et al. | 428/1.31 |
| 5,886,242 A | 3/1999 | Etzbach et al. | |
| 5,942,030 A | 8/1999 | Schuhmacher et al. | |
| 6,071,438 A | * 6/2000 | Leigeber et al. | 252/585 |
| 6,417,902 B1 | * 7/2002 | Greenfield et al. | 349/115 |

FOREIGN PATENT DOCUMENTS

| | | |
|---|---|---|
| DE | 42 40 743 | 6/1994 |
| DE | 43 42 280 | 6/1995 |
| DE | 195 20 660 | 6/1995 |
| DE | 195 20 704 | 12/1996 |
| DE | 195 32 408 | 3/1997 |
| DE | 195 41 820 | 5/1997 |
| DE | 196 02 848 | 7/1997 |
| DE | 196 19 460 | 11/1997 |
| DE | WO 97/49694 | 12/1997 |
| DE | 197 38 369 | 12/1997 |
| DE | 197 57 699 | 12/1997 |
| DE | 196 31 658 | 2/1998 |
| DE | 197 04 506 | 8/1998 |
| DE | 197 13 638 | 10/1998 |
| DE | 197 17 371 | 10/1998 |
| DE | 197 26 050 | 12/1998 |
| DE | 197 35 829 | 2/1999 |
| DE | 197 38 368 | 3/1999 |
| DE | 197 39 263 | 3/1999 |
| DE | 197 44 321 | 4/1999 |
| DE | 197 49 123 | 5/1999 |
| EP | 0 358 208 | 3/1990 |
| EP | 0 724 005 | 7/1996 |
| EP | 0 747 382 | 12/1996 |
| EP | 0 887 398 | 12/1998 |
| EP | 0 985 544 | 3/2000 |
| EP | 0 985 545 | 3/2000 |
| GB | 2 328 436 | 2/1992 |
| GB | 2 330 139 | 4/1999 |
| WO | WO 97 00600 | 1/1997 |
| WO | WO 98 03610 | 1/1998 |
| WO | WO 98 04544 | 2/1998 |
| WO | WO 98/47979 | 10/1998 |
| WO | WO 99/11715 | 3/1999 |
| WO | WO 99/11719 | 3/1999 |
| WO | WO 99/11733 | 3/1999 |

\* cited by examiner

Primary Examiner—Robert H. Kim
Assistant Examiner—P. R. Akkapeddi
(74) Attorney, Agent, or Firm—Oblon, Spivak, McClelland, Maier & Neustadt, P.C.

(57) ABSTRACT

The invention relates to a cholesteric layered material with improved color shift stability.

32 Claims, 4 Drawing Sheets

Figure 1:
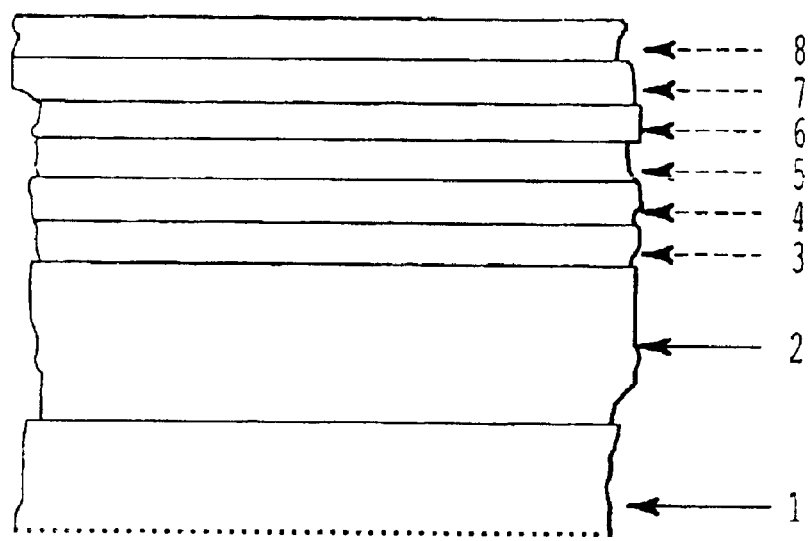

CHOLESTERIC LAYERED MATERIAL HAVING IMPROVED COLOR STABILITY, AND THE PRODUCTION THEREOF

The present invention relates to cholesteric layered materials having improved color stability, comprising at least one three-dimensionally crosslinked, aligned cholesteric layer, to a process for their production, and to their use.

Cholesteric layers, pigments prepared therefrom and compositions containing cholesteric pigments are widely used, for example in the motor vehicle or motor vehicle accessory sector, in the computer, leisure, sport and toy sector, as optical components, such as polarizers or filters, in the cosmetics area, in the textiles, leather or jewelry area, in gift articles, in writing implements, or on spectacle frames, in the construction sector, in the domestic sector, in print products of all types and in the production of paints and coatings, furthermore for the anticounterfeiting treatment of articles, for the coating of utility articles or for the painting of motor vehicles.

In these applications, the cholesteric layers and the pigments and compositions containing the latter have to satisfy a number of conditions in order to be usable for the above-mentioned purposes. Firstly, the color impression should be as bright as possible, and secondly the color impression should be substantially independent of external stimuli, in particular it should be stable over a broad temperature and pressure range and with respect to the action of solvents. In addition, the cholesteric layers should be as thin as possible in order that the pigments prepared therefrom have the smallest possible thickness, thus reducing costs and simplifying the applications.

EP-A 0887398 circumvents the problem of sensitivity of crosslinked cholesteric pigments to solvents by the development of a special matrix in which the crosslinked cholesteric pigments, which are not generally temperature- and solvent-stable, exhibit improved stability.

On use of the cholesteric layers known from the prior art, the problem of inadequate color stability on exposure to heat and/or solvents frequently arises. It is therefore an object of the present invention to provide cholesteric layered material which has adequate color stability.

We have found that, surprisingly, this object is achieved by the provision of a cholesteric layered material comprising at least one three-dimensionally crosslinked, aligned cholesteric layer, where the crosslinked, cholesteric layer(s) does (do) not exhibit only visually evident color shift.

Cholesteric layered materials which satisfy this stability criterion exhibit superior color stability on exposure to heat and/or solvents. The same applies to the products derived from layered materials of this type, for example pigments and films.

The layered materials according to the invention, and products derived therefrom, are distinguished in particular by the fact that they exhibit no visually evident color shift on:

a) a change in the temperature of the layered material in the range from −30° C. to +250° C., in particular from 0 to 250° C., or from 0 to 200° C.;
b) warming to temperatures in the range from 80 to 160° C. or from 80 to 130° C. with simultaneous exposure to a diluent, in particular an organic diluent; and/or
c) treatment for 15 minutes at 80° C. in xylene followed by drying.

According to a preferred embodiment, cholesteric layered material whose reflection maximum, for example after treatment with xylene at 80° C. for 15 minutes, can be shifted by not more than about 10 nm, for example from 0 to 8 nm, from 0 to 5 nm or from 0 to 2 nm, into a higher or lower wavelength range is provided in accordance with the invention. On a change in the reflection maximum in the above-mentioned range, no "visually evident color shift" for the purposes of the invention exists.

In the cholesteric layered materials according to the invention, each cholesteric layer has a mean dry layer thickness (layer thickness of the dried and, if appropriate, crosslinked layer) of at least one pitch height and of less than about 5 $\mu$m, for example from 0.5 to 3 $\mu$m, in particular less than or equal to about 2 $\mu$m, for example from 0.5 to 2 $\mu$m, preferably less than or equal to about 1 $\mu$m, for example from 0.5 to 1 $\mu$m.

If a number of layers are present simultaneously, the individual layer thicknesses are identical or different. The invention thus furthermore relates to cholesteric layered material having a plurality of color shift-stable cholesteric layers of identical or different thickness and of identical or different chemical composition.

In particular, the invention also relates to cholesteric layered materials which have a three-layer structure and an interlayer between two color shiftable cholesteric layers according to the invention which partially or fully absorbs transmitted light. The absorbent interlayer here can have properties as described, for example, in PCT/EP98/05544, PCT/EP 98/05545 or DE-A-197 57 699. The disclosure content of these protective rights are expressly incorporated herein by way of reference.

The invention furthermore relates to cholesteric pigments comprising at least one crosslinked, aligned cholesteric layer which are obtainable by comminuting the above-described single- or multilayer cholesteric layered material. The invention relates in particular to pigments having a mean particle size in the range from 5 to 50 $\mu$m and a thickness of up to 5 $\mu$m in which, in addition, the crosslinked cholesteric layer(s) has (have) high temperature stability.

The pigments preferably have no color shift over a large temperature range, for example from 20 to 250° C. They particularly preferably exhibit no color shift on increasing the temperature to about 80 to 160° C. or 80 to 130° C. with or without exposure to organic diluents, such as toluene and xylene and other diluents as usually used in paint technology.

The invention also relates to a process for the production of the above-described cholesteric layered materials by:

a) application, in particular casting, and simultaneous alignment of a cholesteric coating composition comprising at least one crosslinkable substance to a support with formation of a first cholesteric layer, where the support is essentially chemically inert to the cholesteric layer to be applied;
b) drying and crosslinking of the applied layer, where the conditions are selected in such a way that no visually evident color shift is observed under the above-mentioned conditions; and
c) removal of the layered material from the support after one or more further cholesteric layers have, if desired, been applied to the layer obtained in accordance with step a). The application, drying and curing of the further layers is carried out in the same way as in steps a) and b).

It has in particular been observed in accordance with the invention that the solvent resistance of the cholesteric layered material is affected essentially by the curing conditions, whereas, by contrast, other parameters, such as layer thickness, shear force and drying conditions, can be varied to a greater extent.

The curing conditions can, in accordance with the invention, be set optimally during the curing via various parameters, in particular the output of the radiation source, the curing duration (i.e. residence time in the radiation region of the radiation source) and the layer temperature.

It has also been observed in accordance with the invention that the adhesion between a newly applied and the underlying cholesteric layer can be set specifically and thus in accordance with need by varying the layer temperature during the curing (for example via a heatable roll). Thus, for example, it is possible to produce multilayer composites having stable interlayer adhesion and low adhesion to the support which in this way can be removed well from the support as a composite.

Use is preferably made in accordance with the invention of a support which does not adversely affect the alignment of the cholesteric layer cast thereon during drying and curing. It is furthermore preferred that the support has an adhesion of less than about 1 cN to the dried and crosslinked first cholesteric layer cast thereon. Suitable supports are selected from plastic, metal, glass and ceramic supports.

In accordance with a preferred process variant, use is made of a plastic support which comprises a release layer, for example of crosslinked, preferably aligned, cholesteric material, onto which the first cholesteric layer is cast. Examples of other suitable release layer materials are polyamides, polyacrylates and Teflon. This is particularly advantageous if a cholesteric layer or a layer composite has to be removed from the support, for example if pigments are to be produced from the layered material or a polarizer layer composite is to be transferred to another support. The adhesion here between plastic support and release layer is preferably at least about 2 to 10 times, for example 5 times, greater than the adhesion between release layer and first cholesteric layer. This favors simple detachment of the cholesteric layer or of the layer composite from the support with the release layer simultaneously remaining on the support, which can then, if desired, be re-coated.

Preference is given to coating compositions according to the invention for the cholesteric layer(s) and the release layer which, independently of one another, have a viscosity in the range from about 1 to 50 mPas. in addition, the coating rate is in the range from about 1 to 800 m/min. The solids content of the coating composition is usually from about 30 to 70% by weight.

According to a preferred process variant, the crosslinking of the cholesteric layer(s) and of any cholesteric release layer present is carried out by radiation curing, in particular by electron beams or UV radiation, with simultaneous warming of the layer to be cured. The emitter power here is in the range from about 50 to 200 watts/cm. The curing is preferably carried out in an inert-gas atmosphere, for example under nitrogen.

The layer temperature during the radiation curing is set at above about 60° C., preferably at least 80° C., in particular at least 90° C., for example from 90 to 120° C.

The optimum parameter combination in each case can be determined by the person skilled in the art in a few preliminary experiments on the basis of the teaching according to the invention.

As shown in the attached working examples, layered material of high solvent resistance is obtained, for example, at an emitter power of 120 W/cm, a curing duration of 180 msec and a layer temperature in the range from 60 to 100° C.

According to a further variant of the process according to the invention, a film is applied to the cholesteric layer applied last, and the one or more cholesteric layer(s) is (are) removed from the support as a composite with this film.

According to another variant, the one or more cholesteric layer(s) is (are) removed from the support by blasting with compressed air, a water jet or steam and ground to give pigments.

The invention also relates to compositions comprising at least one cholesteric single- or multilayered pigment having improved color shift stability.

The invention furthermore relates to the use of layered materials or pigments according to the invention in the motor vehicle or motor vehicle accessory sector, in the computer, leisure, sport and toy sector, in optical elements, in the cosmetics area, in the textiles, leather or jewelry area, in gift articles, in writing implements or on spectacle frames, in the construction sector, in the domestic sector, in print products of all types, and in the production of paints and coatings.

The color effects which can be achieved by the cholesteric films or cholesteric pigments according to the invention also cover, due to the wide range of reflection wavelengths which can be achieved, the UV and IR regions and of course the region of visible light. If the pigments according to the invention are applied to banknotes, check cards, other cashless payment means or identity cards (for example by known printing methods) or incorporated into these, this makes identical copying of these articles considerably more difficult. The present invention thus furthermore relates to the use of the pigments according to the invention for the anticounterfeiting treatment of articles, in particular banknotes, check cards or other cashless payment means or identity cards.

For the purposes of the present invention, the term "optical elements" is taken to mean all articles which utilize the optical properties of nematic and/or cholesteric liquid crystals. These can be, by way of selection, retardation films, notch filters, color filters for displays, polarizers, but also simply mirrors for decorative purposes. The three-dimensional shape of the optical elements can be planar, but also with a concave or convex curve.

In particular, the invention also relates to the use of the above compositions for the coating of utility articles or for the painting of motor vehicles.

A preferred area of application is also polarizers comprising a layered material according to the invention, if desired applied to a support film. Thus, for example, broad-band polarizers can be produced which comprise a layered material having a number of, for example, from 3 to 20 cholesteric layers with reflection maxima matched to one another, where the polarizer has a total thickness (without support film) in the range from about 2 to 50 $\mu$m.

Depending on the application, the layered material according to the invention can remain on the support, be detached therefrom or transferred to a new support. Thus, for example, IR-reflective layer composites (with transparent adhesive layer) can be transferred to glass or Plexiglass sheets.

Suitable compositions of the cholesteric layer are described in DE-A-197 38 368.8 and 197 38 369.6 by the same applicant. The disclosure content of the application is incorporated by way of reference in its full scope. In particular, it is evident from DE-A-197 38 369.6 that it is advantageous to produce cholesteric layers using a cholesteric mixture which has been rendered pourable by dilution. Cholesteric and nematic molecules which can be used for the production of the layers are described, for example, in DE-A-43 42 280, 196 02 848, 197 136 38, 195 32 408, 197

04 506, 196 31 658, 197 17 371, 195 41 820, 196 19 460, 197 35 829, 197 44 321 and 197 49 123, EP-A-0 358 208, WO 97/00600, 97/49694, 98/03610, 98/04544, 98/14442, 98/23580 and 98/47979, which are expressly incorporated herein by way of reference.

The cholesteric layers preferably comprise cholesteric mixtures selected from a) at least one cholesteric, polymerizable monomer;
b) at least one achiral, nematic, polymerizable monomer and a chiral compound;
c) at least one cholesteric, crosslinkable polymer;
d) a cholesteric polymer in a polymerizable diluent; or
e) at least one cholesteric polymer whose cholesteric phase can be frozen by rapid cooling to below the glass transition temperature, in the cured state.

The alignment of the cholesteric molecules in the cholesteric layer is fixed by curing. On use of a plurality of cholesteric layers, these have identical or different optical properties. They can, in particular, reflect light of identical or different wavelength, i.e. can be of identical or different color. In the latter case, particularly interesting color effects can be achieved. For example, the layers have opposite directions of optical rotation, meaning that, for example, one layer reflects light of a certain wavelength in a left-handed circular-polarized manner, whereas another layer reflects light of the same wavelength in a right-handed circular-polarized manner. For example, a paint comprising pigments according to the invention in this preferred embodiment therefore advantageously appears particularly bright, since the pigments in the paint films face the incident light in the random distribution, so that the paint reflects both right- and left-handed circular-polarized light of a certain wavelength, whereas a paint comprising only pigments having only one cholesteric layer or having a plurality of cholesteric layers having the same direction of optical rotation allows either the left- or right-handed circular-polarized light to pass through. The formation of a plurality of cholesteric layers having different reflection wavelengths allows broad-band polarizers to be produced.

The plurality of layers can also have identical or different mechanical properties. For example, they can be of different thickness or brittleness.

A preferred group of coating compositions which can be used in accordance with the invention (above group b)) comprises, as nematic component, at least one liquid-crystalline compound of the general formula I $$Z^1-Y^1-A^1-Y^3-M-Y^4-A^2-Y^2-Z^2 \qquad (I),$$

in which $Z^1$ and $Z^2$, independently of one another, are a radical containing reactive, polymerizable groups;

$Y^1-Y^4$, independently of one another, are a single chemical bond, —O—, —S—, —O—CO—, —CO—O—, —O—CO—O—, —CO—NR—, —NR—CO—, —O—CO—NR—, —NR—CO—O— or —NR—CO—NR, and R is $C_1$–$C_4$-alkyl;

$A^1$ and $A^2$, independently of one another, are a spacer having 1 to carbon atoms in which the carbon chain is, if desired, interrupted by ether oxygen, thioethersulfur or non-adjacent imino or $C_1$–$C_4$-alkylimino groups; and M is a mesogenic group.

Preferred radicals $Z^1$ and $Z^2$ are the following

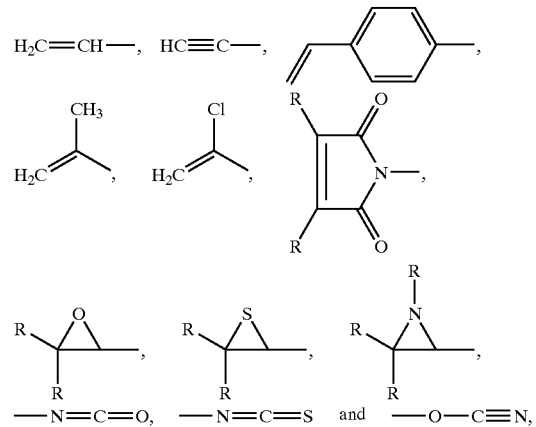

where the radicals R are $C_1$–$C_4$-alkyl and may be identical or different.

Of the reactive polymerizable groups, the cyanates can spontaneously trimerize to cyanurates and are therefore preferred. Compounds containing epoxide, thiirane, aziridine, isocyanate and isothiocyanate groups require further compounds containing complementary reactive groups for polymerization. Thus, for example, isocyanates can polymerize with alcohols to give urethanes and with amines to give urea derivatives. An analogous situation applies to thiiranes and aziridines. The complementary reactive groups here can either be present in a second compound according to the invention which is mixed with the first or they can be introduced into the polymerization mixture by means of auxiliary compounds containing two or more of these complementary groups. If these compounds each contain two of these reactive groups, linear polymers having a predominantly thermoplastic character are formed. If the compounds contain more than two reactive groups, crosslinked polymers which are particularly mechanically stable are formed. The maleimido group is particularly suitable for free-radical copolymerization with olefinic compounds, such as styrene.

Preferred polymerizable groups $Z^1$ and $Z^2$ are those which undergo free-radical polymerization, i.e. in particular olefinically unsaturated groups, and of these the groups

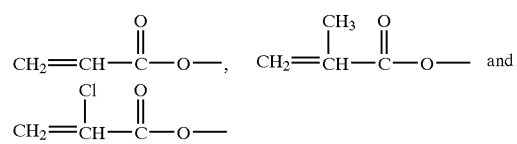

are of particular importance in combination with $Y^1$ or $Y^2$.

The moieties $Z^1$, $Z^2$, $A^1$, $A^2$, M and X present in the compounds according to the invention are linked to one another via bridging units $Y^1-Y^4$, such as —O—, —S—, —CO—O—, —O—CO—, —O—CO—O—, —CO—NR—, —NR—CO—, —O—CO—NR—, —NR—CO—O—, —NR—CO—NR—, or alternatively via a direct bond. Chiral polymerizable compounds containing one of these groups have the advantageous property of particularly low phase-conversion temperatures and broad phase ranges and are thus particularly suitable for applications at room temperature. This is particularly true of the carbonate group.

Suitable spacers $A^1$ and $A^2$ are all groups known for this purpose. The spacers generally have from 1 to 30, preferably 3 to 12, carbon atoms and consist of predominantly linear aliphatic groups. They may be interrupted in the chain, for example by non-adjacent oxygen or sulfur atoms or imino or alkylimino groups, such as methylimino groups. Suitable substituents for the spacer chain are also fluorine, chlorine, bromine, cyano, methyl and ethyl.

Examples of representative spacers are the following:

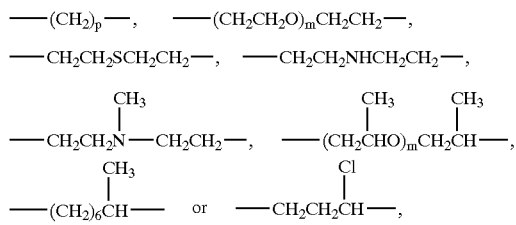

where
m is from 1 to 3 and p is from 1 to 12.

The radicals M can be any known mesogenic groups. Particularly suitable are groups of the formula Ia $$—(—T—Y^5—)_r—T—$$ (Ia)

in which the variables have the following meanings:

T are divalent saturated or unsaturated, isocyclic or heterocyclic radicals, $Y^5$ is a bridging unit as defined for $Y^1$–$Y^4$; —$CH_2$—O—; —O—$CH_2$—; —CH=N—, —N=CH— or —N=N—, r is 0, 1, 2 or 3, where the radicals T and $Y^5$ in the case where r>0 may be identical or different.

r is preferably 1 or 2.

The radicals T may also be ring systems which are substituted by fluorine, chlorine, bromine, cyano, hydroxyl or nitro. Preferred radicals T are the following:

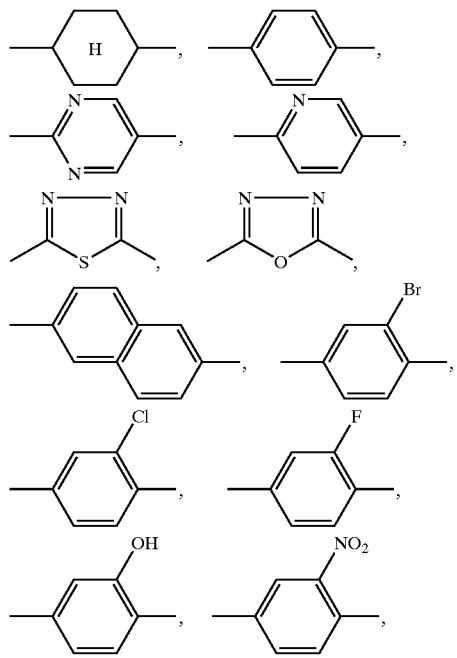

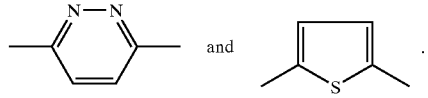

Examples of preferred mesogenic groups M are the following:

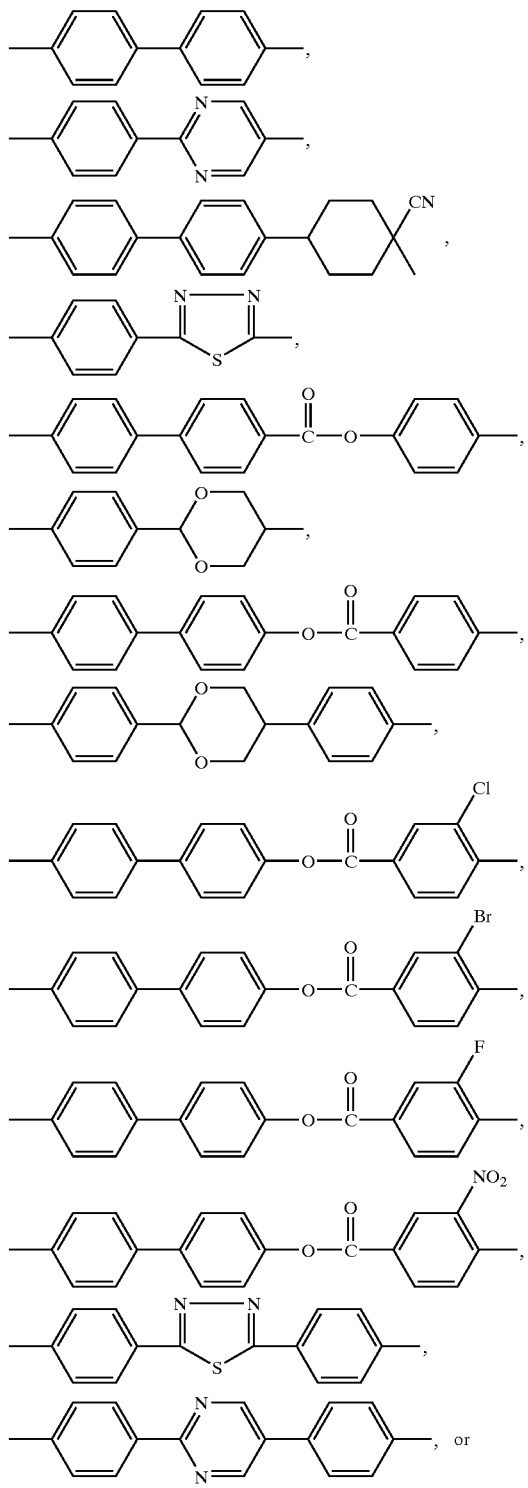

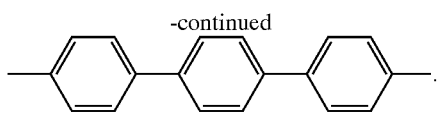

Particularly preferred mesogenic groups M are those of the following formulae:

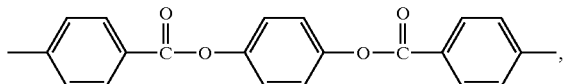

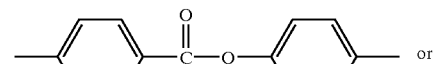

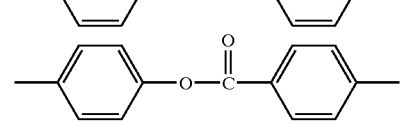

where each ring may carry up to three identical or different substituents from the following group:

$C_1$–$C_{20}$-alkyl, $C_1$–$C_{20}$-alkoxy, $C_1$–$C_{20}$-alkoxycarbonyl, $C_1$–$C_{20}$-monoalkylaminocarbonyl, $C_1$–$C_{20}$-alkylcarbonyl, $C_1$–$C_{20}$-alkylcarbonyloxy, $C_1$–$C_{20}$-alkylcarbonylamino, formyl, halogen, cyano, hydroxyl and nitro.

Preferred substituents for the aromatic rings, besides fluorine, chlorine, bromine, cyano, formyl and hydroxyl, are in particular short-chain aliphatic radicals, such as methyl, ethyl, n-propyl, isopropyl, n-butyl, isobutyl, tert-butyl and alkoxy, alkoxycarbonyl, alkylcarbonyl, alkylcarbonyloxy, alkylcarbonylamino and monoalkylaminocarbonyl radicals containing these alkyl groups.

The outer benzene rings of the particularly preferred groups M preferably have the following substitution pattern:

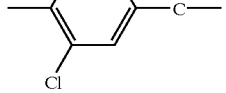

or they are substituted analogously by F, Br, $CH_3$, $OCH_3$, CHO, $COCE_3$, $OCOCH_3$ or CN in place of Cl, where the substituents may also be mixed. Mention should furthermore be made of the structures

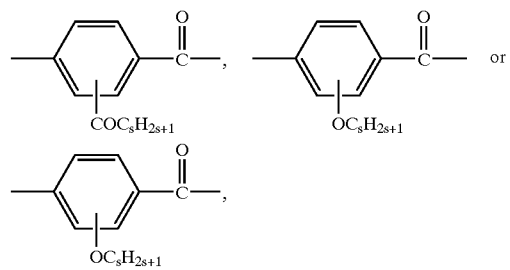

in which s is from 2 to 20, preferably from 8 to 15.

The preferred substitution patterns of the central benzene ring of the particularly preferred groups M are the following:

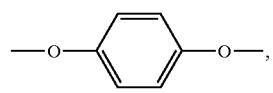

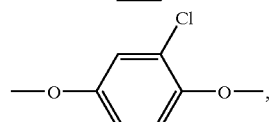

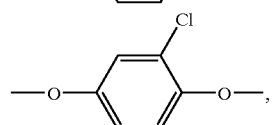

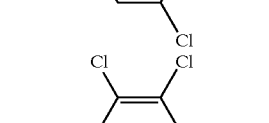

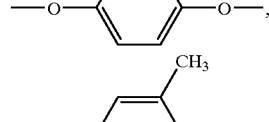

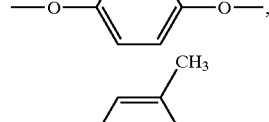

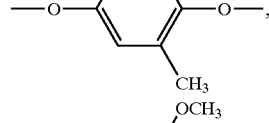

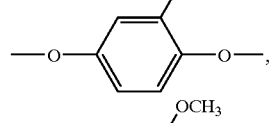

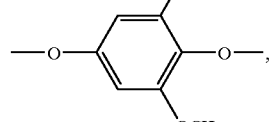

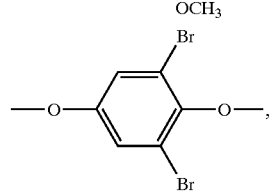

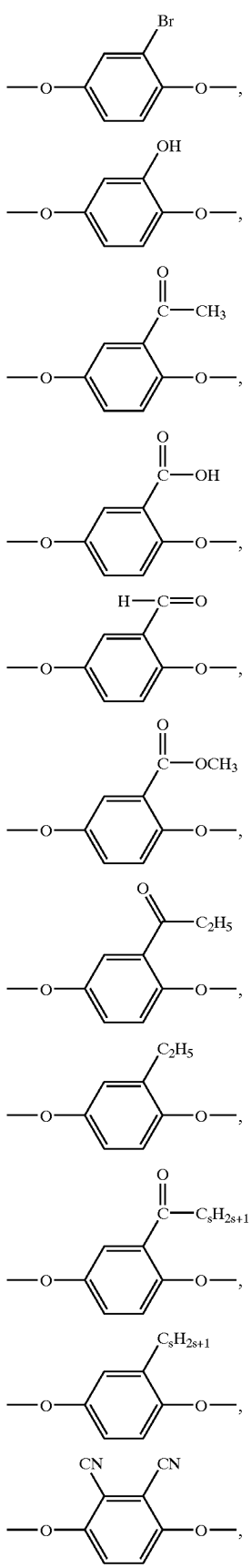

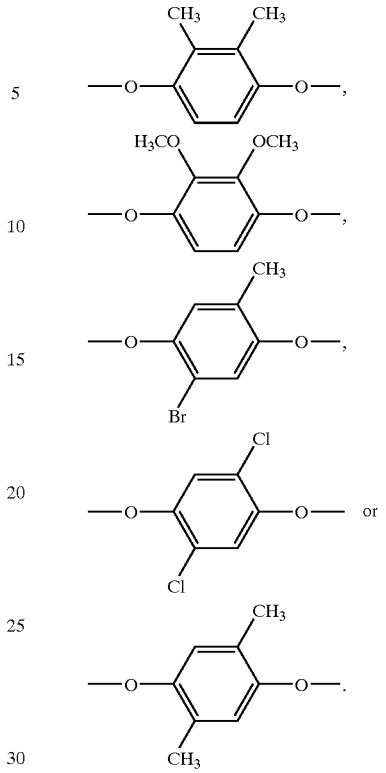

Preferred compounds I according to the invention are also those in which the radical pairs $Z^1$ and $Z^2$, $Y^1$ and $Y^2$, $Y^3$ and $Y^4$ and $A^1$ and $A^2$ are in each case identical.

Very particular preference is given to the mesogenic group M of the following formula:

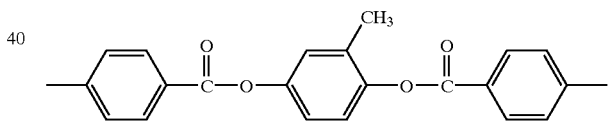

Mixtures of the compounds I according to the invention can also be prepared. Such mixtures usually have reduced viscosity compared with the pure mixture components and generally have lower liquid-crystalline phase temperatures, which means that they are in some cases suitable for applications at room temperature.

In the mixtures of the compounds according to the invention, not only, for example, "tricyclic", unsubstituted or ring-substituted mesogenic groups M of the formula

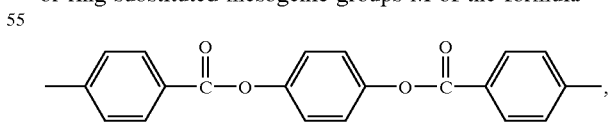

in which case, in the formula Ia,

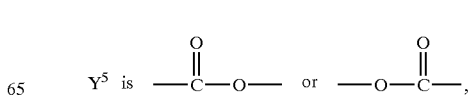

T is three identical, substituted or unsubstituted radicals and

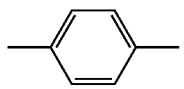

and
r is 2, can occur as molecular fragments, but also, for example, "bicyclic" groups M of the formulae

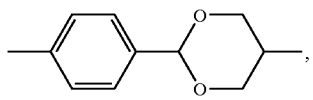

(in which case, in the formula Ia,

Y$^5$ is a single chemical bond,

T are different radicals

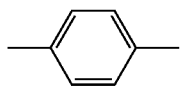

(unsaturated, isocyclic) and

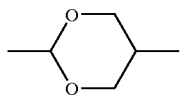

(saturated, heterocyclic), and
r is 1) or

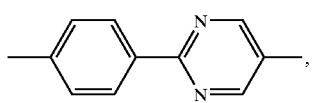

in which case, in the formula Ia
Y$^5$ is a single chemical bond,
T are different radicals

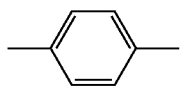

(unsaturated, isocyclic) and

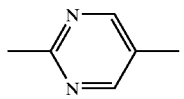

(unsaturated, heterocyclic), and
r is 1.

Particularly preferred "bicyclic" mesogenic groups M here are the fragments

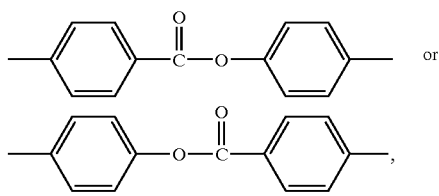

which may be additionally substituted on the aromatic rings as described above.

Liquid-crystal compositions which comprise one or more of the compounds of the formula I may additionally also comprise one or more chiral compounds. This gives rise to the formation of cholesteric liquid-crystalline phases, which, in particular, have interesting optical properties and, for example, reflect light of different wavelength depending on the viewing angle. Such liquid-crystal compositions are particularly suitable for use in optical elements.

Particularly suitable chiral components are those which on the one hand have a large twisting power and on the other hand are readily miscible with the liquid-crystalline compounds without interfering with the liquid-crystalline phase structure.

Preferred chiral compounds which are used, for example, in mixtures as in the above group b) are, for example, those of the general formulae Ib, Ic, Id and Ie:

$$(Z^1-Y^5)_nX, \quad \text{(Ib)}$$

$$(Z^1-Y^1-A^1-Y^5)_nX, \quad \text{(Ic)}$$

$$(P^1-Y^5)_nX, \quad \text{(Id)}$$

$$(Z^1-Y^1-A^1-Y^3-M-Y^4)_nX, \quad \text{(Ie)}$$

where the variables A$^1$, Z$^1$, Y$^1$, Y$^3$, Y$^4$, Y$^5$ and n are as defined above for the formula I, P$^1$ is a radical selected from hydrogen, C$_1$–C$_{30}$-alkyl, C$_1$–C$_{30}$-acyl, C$_3$–C$_8$-cycloalkyl, unsubstituted or substituted by one to three C$_1$–C$_6$-alkyl, and where the carbon chain of the alkyl, acyl and cycloalkyl radicals may be interrupted by ether oxygen, thioethersulfur or by non-adjacent imino or C$_1$–C$_4$-alkylimino groups, n is a number from 1 to 6, and X is an n-valent chiral radical.

Examples of radicals X are the following:

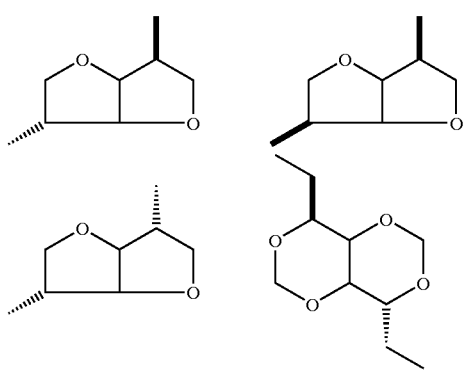

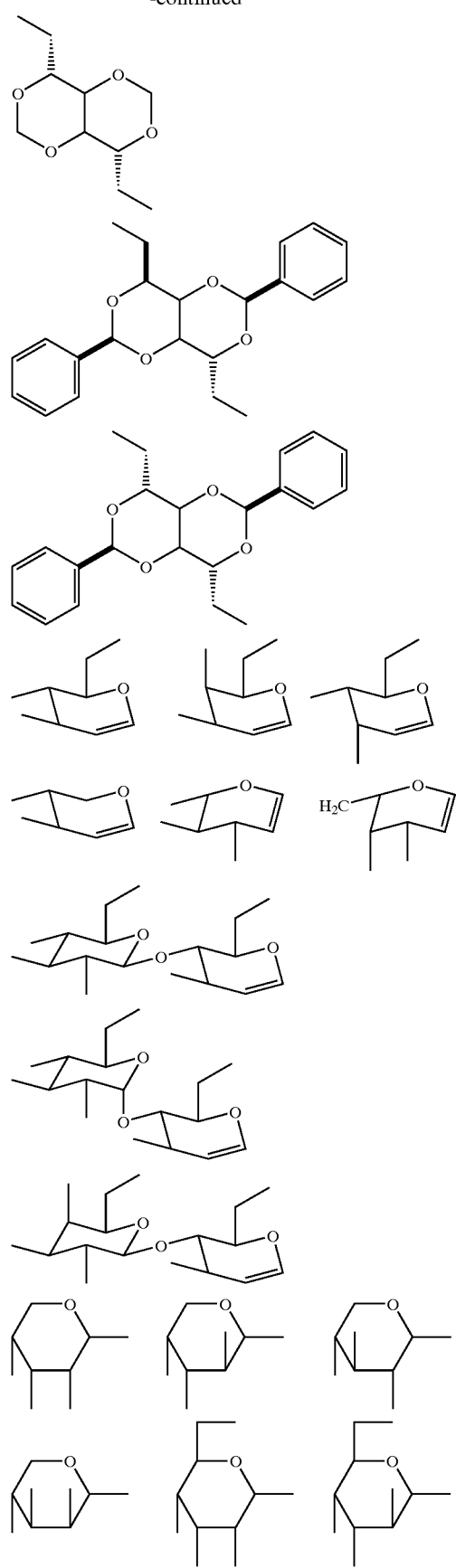
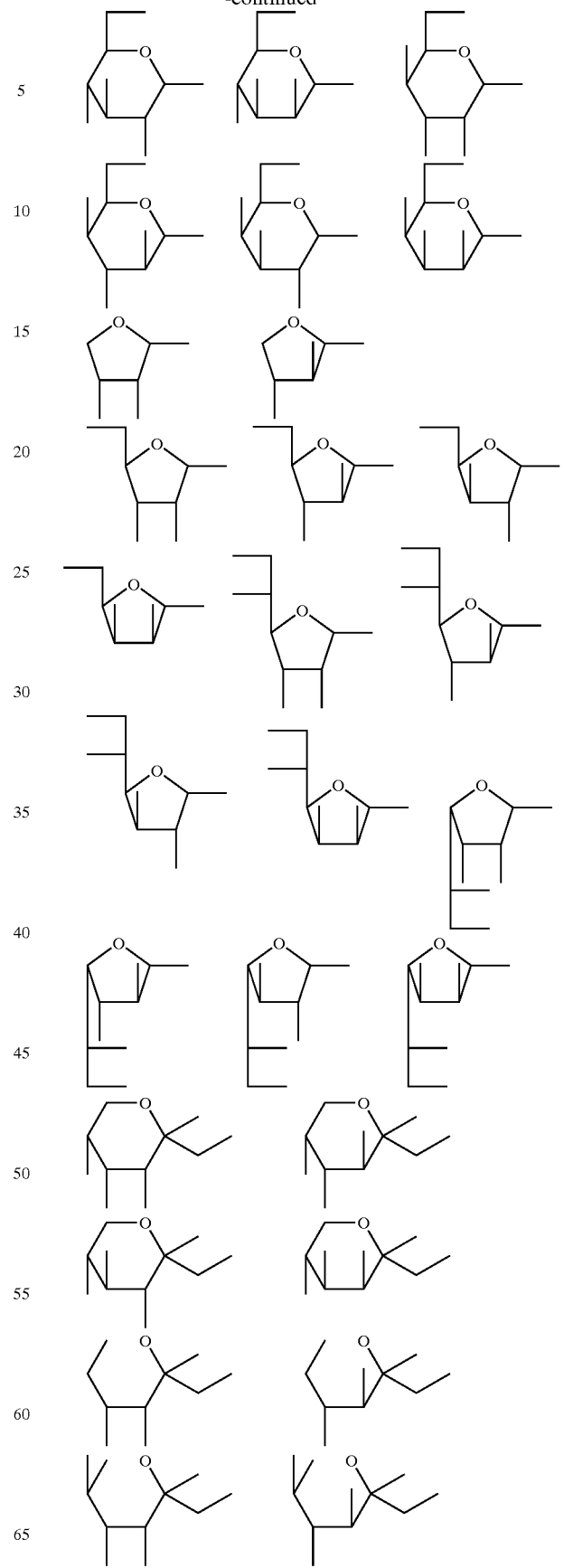

-continued

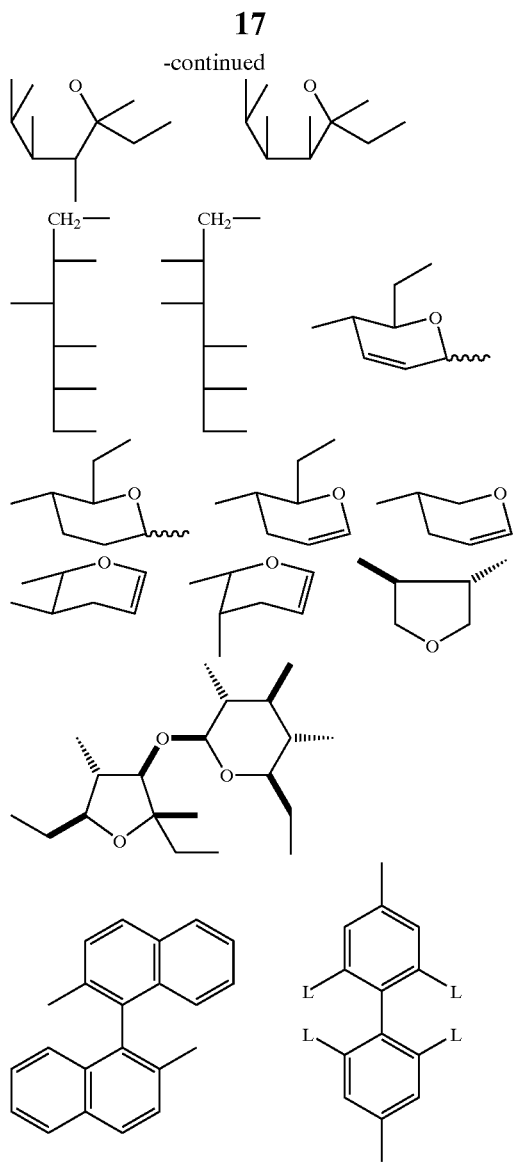

where

L is $C_1$- to $C_4$-alkyl, $C_1$–$C_4$-alkoxy, halogen, COOR, OCOR, CONHR or NHCOR, and R is $C_1$–$C_4$-alkyl.

(The terminal dashes in the above formulae indicate the free valences).

Particular preference is given, for example, to the following:

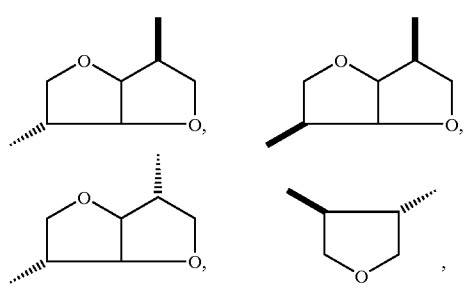

-continued

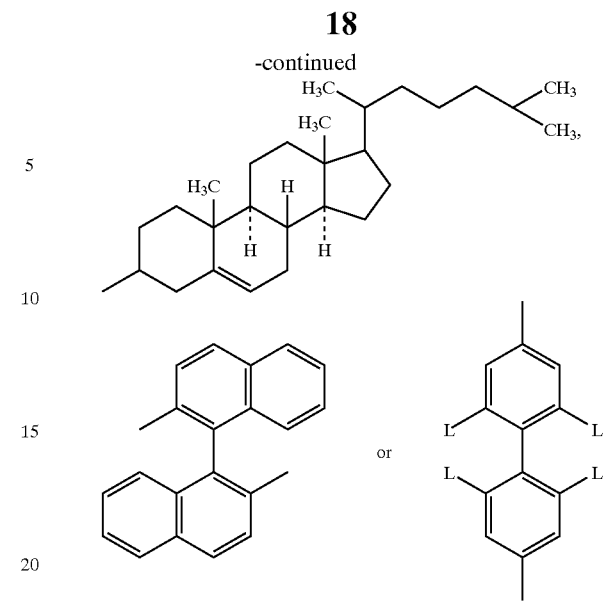

These and other preferred chiral components are mentioned, for example, in DE-A 43 42 280 and in German patent applications 19520660.6 and 19520704.1.

Other suitable radicals X are the following:

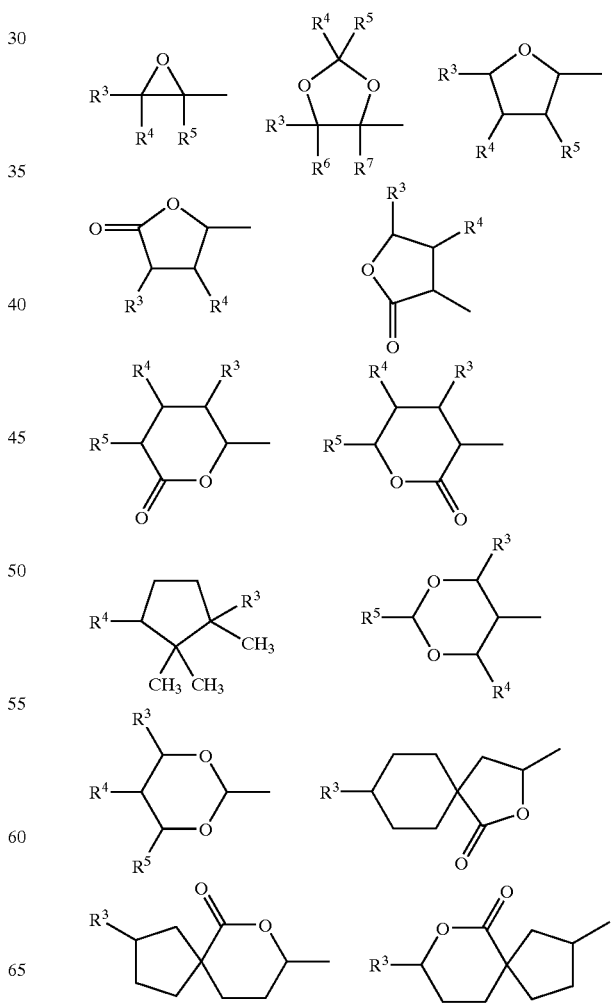

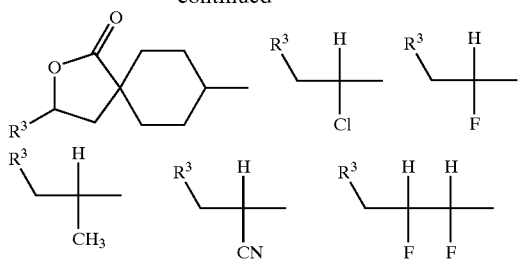

in which $R^3$, $R^4$, $R^5$, $R^6$ and $R^7$ are identical or different and are hydrogen, or a straight-chain or branched alkyl radical, with or without an asymmetrical carbon atom, having 1 to 16 carbon atoms, where one or more non-adjacent and non-terminal $CH_2$ groups may be replaced by O, and/or one or two $CH_2$ groups may be replaced by $CH=CH-$, or $R^4$ and $R^5$ together may also be $-(CH_2)_4-$ or $-(CH_2)_5-$ if they are bonded to an oxirane, dioxolane, tetrahydrofuran, tetrahydropyrane, butyrolactone or valerolactone system.

Particularly preferred chiral components are the following compounds (A) to (G):

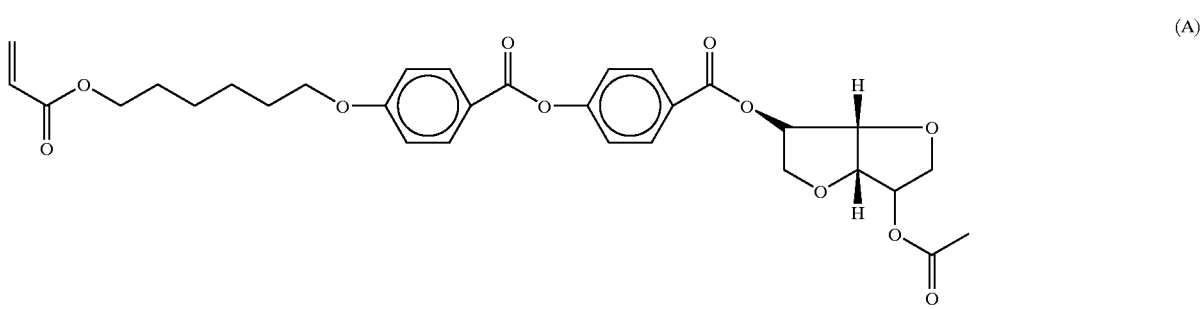

(A)

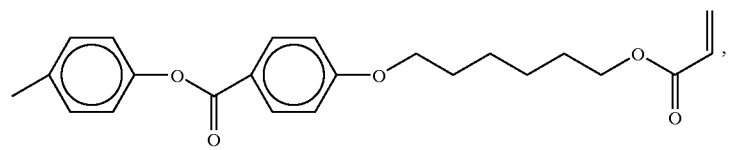

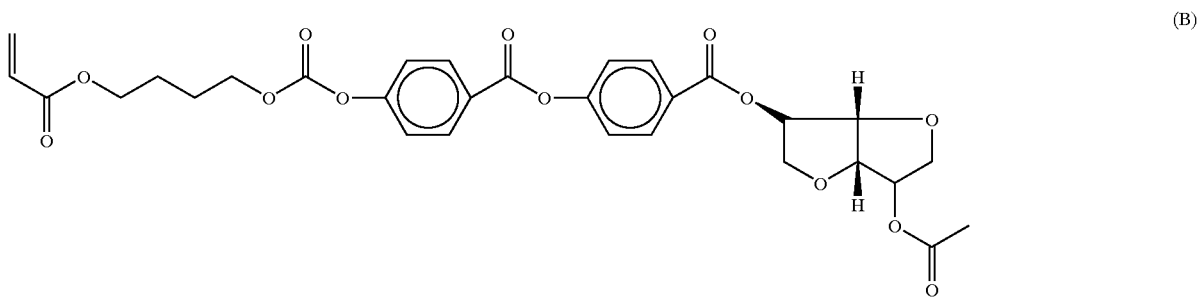

(B)

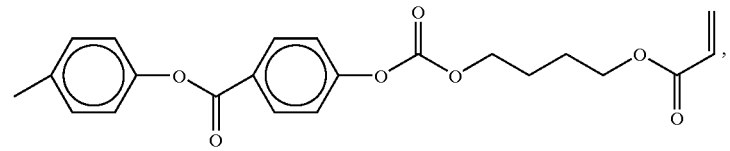

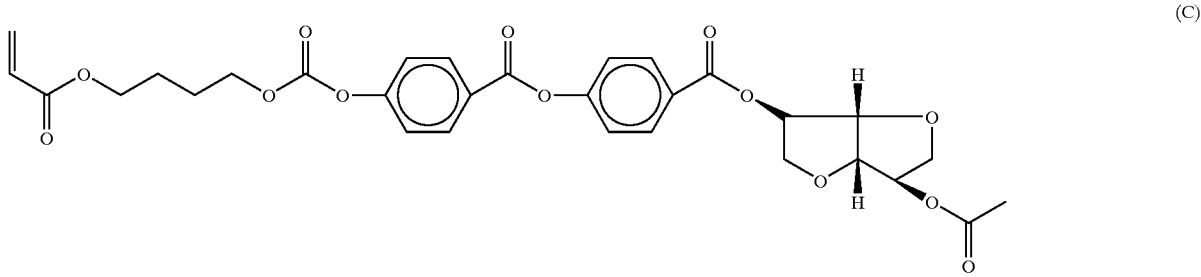

(C)

-continued
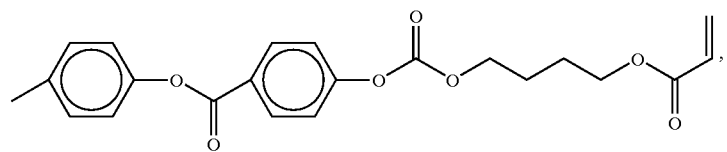
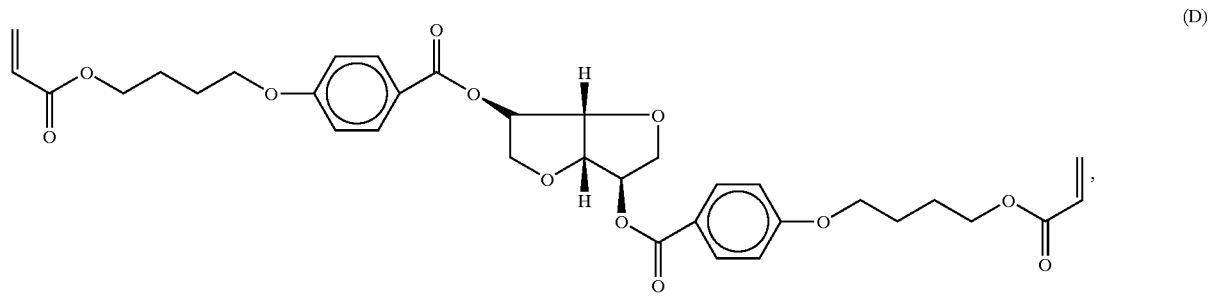
(D)
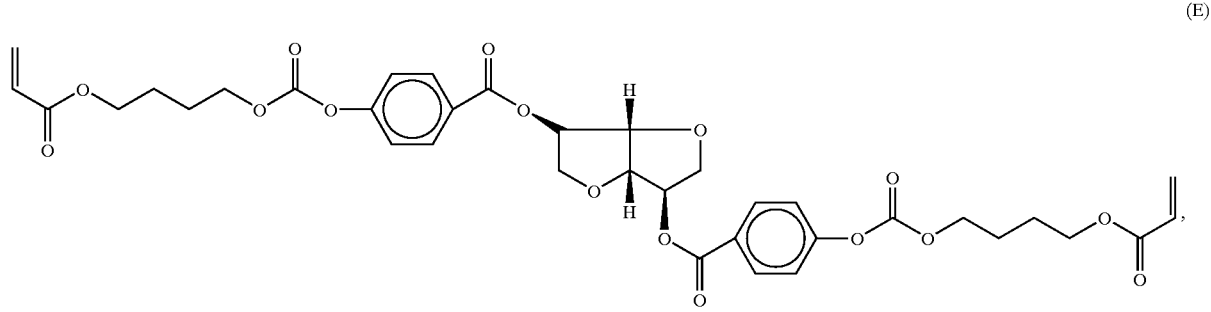
(E)
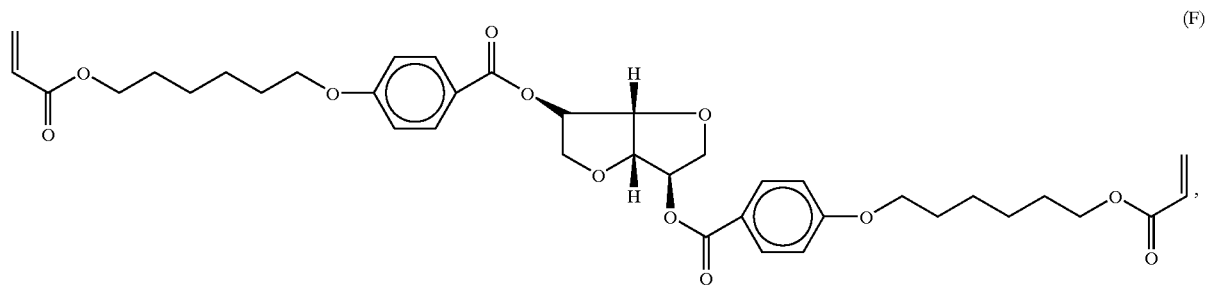
(F)
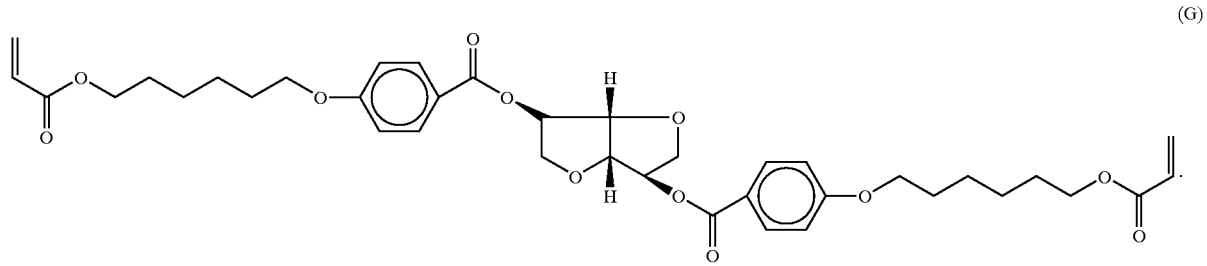
(G)

The following compounds of the formulae (H) and (K) may be mentioned as non-limiting examples of suitable nematic compounds:

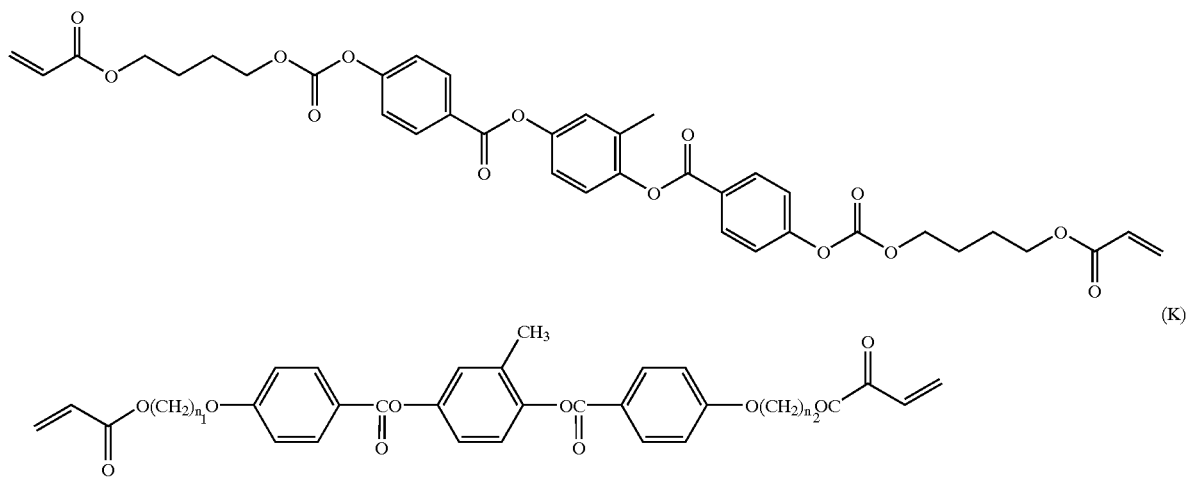

in which $n_1$ and $n_2$, independently of one another, are 2, 3, 4 or 6, where the monomer of the formula (K) is preferably employed in the form of a mixture of compounds where $n_1/n_2$ is 2/3, 2/4, 2/6, 3/4, 3/6, 4/4, 4/6, 6/4 and 6/6. In the compounds of the formulae (H) and (K), the methyl substituent on the central benzene ring may also, if desired, be replaced by a hydrogen atom.

If the compounds or liquid-crystal compositions according to the invention are polymerized, the liquid-crystalline ordered state can be fixed. The polymerization can be carried out, for example, thermally or photochemically, depending on the polymerizable group. Together with the compounds or liquid-crystal compositions according to the invention, other monomers can also be copolymerized. These monomers may be other polymerizable liquid-crystalline compounds, chiral compounds which are likewise preferably copolymerized covalently, or conventional crosslinking agents, such as polyvalent acrylates, vinyl compounds or epoxides. Particularly in the case of isocyanates, isothiocyanates or epoxides as polymerizable liquid-crystal compounds, the crosslinking agent is preferably a polyvalent alcohol, so that, for example, urethanes can be formed. The crosslinking agent must be matched in amount to the polymerization conditions in such a way that firstly satisfactory mechanical stability is achieved, but secondly the liquid-crystalline phase behavior is not impaired. The amount of crosslinking agent therefore depends on the specific application of the polymers. For the preparation of pigments, a larger amount of crosslinking agent is advantageous, while for the production of thermoplastic layers or, for example, for display alignment layers, a smaller amount of crosslinking agent is necessary. The amount of crosslinking agent can be determined by a few preliminary experiments.

A further modification of the polymerization product prepared from the compounds or liquid-crystal compositions according to the invention is possible through the addition of polymeric auxiliaries before the polymerization. Such auxiliaries should preferably either be soluble in the starting mixtures or alternatively in an organic solvent which is compatible with the starting mixtures. Typical representatives of such polymeric auxiliaries are, for example, polyesters, cellulose esters, polyurethanes and polyether- or polyester-modified or even unmodified silicones. The amount of polymeric auxiliary which may have to be added for the desired purpose, its chemical nature and possibly the amount and type of solvent are generally familiar to the person skilled in the art or can likewise be determined experimentally by means of a few preliminary experiments.

Besides the compounds of the formulae Ia to Ie, further compounds which are incorporated non-covalently into the polymeric network can also be admixed. These can be, for example, commercially available nematic liquid crystals.

Further additives can also be pigments, dyes and fillers.

The pigments can be inorganic compounds, for example iron oxides, titanium oxide and carbon black, and the organic compounds can be, for example, pigments or dyes from the classes of the monoazo pigments, monoazo dyes and metal salts thereof, disazo pigments, condensed disazo pigments, isoindoline derivatives, derivatives of naphthalene- or perylenetetracarboxylic acid, anthraquinone pigments, thioindigo derivatives, azomethine derivatives, quinacridones, dioxazines, pyrazoloquinazolones, phthalocyanine pigments or basic dyes, such as triarylmethane dyes, and salts thereof.

Before application, the liquid-crystalline materials are dissolved in a readily volatile solvent and, if desired, combined with necessary additives. The additives employed can be polymerization inhibitors or initiators, flow-control agents, deaerating agents, adhesives, binders, dispersants, etc.

The cholesteric layers and any release layer present are produced by applying a layer of the optionally reactive, pourable cholesteric mixture, preferably by pouring, onto a support, preferably a mobile support, and forming a solid cholesteric layer. The reactive, pourable cholesteric mixture is preferably applied in the isotropic phase. In a preferred embodiment, the reactive, pourable cholesteric mixture is diluted before pouring and forms the solid cholesteric layer where appropriate with removal of the diluent (during or after). The formation of the solid cholesteric layer can take place by crosslinking, by polymerization or by rapid cooling to below the glass transition temperature (freezing of the cholesteric phase), where the term "crosslinking" is taken to mean the covalent linking of polymeric compounds, and the term "polymerization" is taken to mean the covalent linking of monomeric compounds to form polymers. The term "curing" is taken to mean crosslinking, polymerization or freezing of the cholesteric phase. For the purposes of the present invention, a mixture is referred to as reactive if at least one compound present in the mixture is capable of forming covalent linkages.

The mobile support is preferably strip-shaped and consists, for example, of a web of metal foil, paper or plastic film. The cholesteric mixture is preferably applied with a proportion of diluent of from about 5 to 95% by weight, in particular from about 30 to 80% by weight, in particular from about 40 to 70% by weight, particularly preferably from about 55 to 60% by weight, in each case based on the total weight of the mixture to be applied.

Examples of diluents which can be employed in the process according to the invention are linear or branched esters, especially esters of acetic acid, such as ethyl and butyl acetate, cyclic ethers and esters, alcohols, lactones, aliphatic and aromatic hydrocarbons, such as toluene, xylene and cyclohexane, and ketones, amides, N-alkylpyrrolidones, especially N-methylpyrrolidone, and in particular tetrahydrofuran (THF), dioxane and methyl ethyl ketone (MEK). Preference is given to organic diluents having a boiling point of below 140° C.

Further examples of suitable diluents are ethers and cyclic ethers, such as tetrahydrofuran or dioxane, chlorinated hydrocarbons, such as dichloromethane, 1,1,2,2-tetrachloroethane, 1-chloronaphthalene, chlorobenzene or 1,2-dichlorobenzene. These diluents are particularly suitable for polyesters and polycarbonates. Suitable diluents for cellulose derivatives are, for example, ethers, such as dioxane, or ketones, such as acetone. If copolyisocyanates are employed as group d) polymers, it is appropriate to use polymerizable diluents, as described in U.S. Pat. No. 08,834, 745. Such polymerizable diluents are, for example

- esters of α,β-unsaturated mono- or dicarboxylic acids, in particular $C_3$–$C_6$-mono- or -dicarboxylic acids, with $C_1$–$C_{12}$-alkanols, $C_2$–$C_{12}$-alkanediols or $C_1$–$C_6$-alkyl ethers and phenyl ethers thereof, for example acrylates and methacrylates, hydroxyethyl or hydroxypropyl acrylate or methacrylate, and 2-ethoxyethyl acrylate or methacrylate;
- vinyl $C_1$–$C_{12}$-alkyl ethers, such as vinyl ethyl ether, vinyl hexyl ether or vinyl octyl ether;
- vinyl esters of $C_1$–$C_{12}$-carboxylic acids, such as vinyl acetate, vinyl propionate and vinyl laurate;
- $C_3$–$C_9$-epoxides, such as 1,2-butylene oxide and styrene oxide;
- N-vinylpyrrolidone, N-vinylcaprolactam and N-vinylformamide;
- vinylaromatic compounds, such as styrene, α-methylstyrene and chlorostyrene, and
- compounds containing two or more crosslinkable groups, such as diesters of diols (including polyethylene glycols) with acrylic or methacrylic acid or divinylbenzene.

Examples of preferred polymerizable diluents are 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate and tetraethylene glycol dimethacrylate. A particularly preferred polymerizable diluent is styrene.

The mixtures too can contain small amounts of polymerizable diluents in addition to the inert diluent. Preferred polymerizable solvents which can be added are acrylates, in particular acrylates of higher functionality, such as bis-, tris- or tetraacrylates, particularly preferably high-boiling oligoacrylates. The preferred amount added is about 5% by weight, based on the total weight of the mixture.

If desired, water can also be added to the diluent or even employed as the only diluent.

The crosslinkable or polymerizable mixture can contain commercially available photoinitiators for the photochemical polymerization. These are not necessary for curing by electron beams. Examples of suitable photoinitiators are isobutyl benzoin ether, 2,4,6-trimethylbenzoyldiphenylphosphine oxide, 1-hydroxycyclohexyl phenyl ketone, 2-benzyl-2-dimethylamino-1-(4-morpholinophenyl)furan-1-one, mixtures of benzophenone and 1-hydroxycyclohexyl phenyl ketone, 2,2-dimethoxy-2-phenyl-acetophenone, perfluorinated diphenyltitanocenes, 2-methyl-1-(4-[methylthio]phenyl)-2-(4-morpholinyl)-1-propanone, 2-hydroxy-2-methyl-1-phenylpropan-1-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of 2-isopropylthioxanthone and 4-isopropylthioxanthone, 2-(dimethylamino)ethyl benzoate, d,l -camphorquinone, ethyl-d,l -camphorquinone, mixtures of benzophenone and 4-methylbenzophenone, benzophenone, 4,4'-bisdimethylamine-benzophenone, ($\eta^5$-cyclopentadienyl)($\eta^6$-isopropylphenyl)iron(II) hexafluorophosphate, triphenylsulfonium hexafluorophosphate or mixtures of triphenylsulfonium salts, and butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate.

The brightness of the pigment layer can be increased by addition of small amounts of suitable flow-control agents. From about 0.005 to 1% by weight, in particular from 0.01 to 0.5% by weight, based on the amount of cholesteric compound employed, can be used. Suitable flow-control agents are, for example, glycols, silicone oils and in particular acrylate polymers, such as the acrylate copolymers available under the name Byk 361 or Byk 358 from Byk-Chemie, and the modified silicone-free acrylate polymers available under the name Tego flow ZFS 460 from Tego.

If desired, the polymerizable or crosslinkable mixture can also contain stabilizers against UV and weathering effects. Examples of compounds which are suitable for this purpose are derivatives of 2,4-dihydroxybenzophenone, derivatives of 2-cyano-3,3-diphenyl acrylate, derivatives of 2,2',4,4'-tetrahydroxy-benzophenone, derivatives of ortho-hydroxyphenylbenzotriazole, salicylates, ortho-hydroxyphenyl-s-triazines or sterically hindered amines. These substances can be employed alone or preferably in the form of mixtures.

The pourable, reactive cholesteric mixture preferably has a viscosity in the range from about 0.1 to 50 mPas, in particular from about 1 to 10 mPas, measured at 23° C.

The cholesteric mixture is particularly preferably applied to the support at a rate of from about 1 to 800 m/min, in particular from about 5 to 100 m/min.

In a preferred embodiment of the process, the mixture is applied to the substrate by means of a roll coater, reverse roll coater, knife reverse roll coater, slot die, a kiss coater or in particular by means of an extrusion coater, doctor coater or knife coater, very particularly preferably by means of a doctor coater or knife coater.

The mixture is advantageously applied by means of a coating device which subjects the mixture to a high shear gradient during application. Measures for influencing the shear gradient are familiar to the person skilled in the art, who is familiar with coating devices.

Preference is given to a coating device whose coating gap width is in the range from about 2 to 50 µm, in particular from about 4 to 15 µm. It is also advantageous to work at a coater excess pressure of from about 0.01 to 0.7 bar, preferably from 0.05 to 0.3 bar.

Particularly suitable apparatuses for the production of cholesteric layers are coating machines having a knife coater applicator with which a cholesteric mixture can be applied to a support film transported over a roll rotating with very high precision. The coating knife is advantageously mounted on a precision sledge, so that a defined gap against the support film can be set precisely.

The applied layer is dried by means of a drying device, for example by means of a circulated-air dryer, and subsequently, or instead of the drying, polymerized or crosslinked thermally, by UV radiation or by electron beams, curing by UV radiation or by electron beams being preferred.

The applied layer is preferably dried to a residual content of volatile diluents of less than 1% by weight, based on the dry weight of the applied layer. The drying is preferably carried out at a temperature in the range from 20 to 100° C. for a period of from about 1 to 120 seconds. The optimum drying conditions here can be matched to the layer thickness and coating rate used in each case. In this way, for example, cured cholesteric layers having a mean dry layer thickness of from 0.2 to 1 µm are obtained. The minimum dry thickness corresponds to the pitch height, i.e. the ratio of reflection wavelength to refractive index.

The cholesteric layers produced in accordance with the invention have a mean layer thickness variation of 50 nm or less, for example less than 40, 30, 20 or 10 nm, which results in high color constancy of the cholesteric layer. The mean layer thickness variation can be determined in a simple manner, for example microscopically from thin sections. A suitable determination method can be carried out, for example, in accordance with the method described in EP-A-0 566 100.

Other binders which can be employed for the release layer and for the cholesteric layers are monomeric agents and mixtures thereof with polymeric binders. Suitable monomeric agents are preferably those containing two or more crosslinkable groups, such as acrylic, methacrylic, α-chloracrylic, vinyl, vinyl ether, epoxide, cyanate, isocyanate or isothiocyanate groups. Particular preference is given to acrylic, methacrylic and vinyl ether groups. Monomeric agents containing two crosslinkable groups are, for example, the diacrylates, the divinyl ethers and the dimethacrylates of diols, for example propanediol, butanediol, hexanediol, ethylene glycol, diethylene glycol, triethylene glycol or tetrapropylene glycol.

Monomeric agents containing three crosslinkable groups are, for example, the triacrylates, the trivinyl ethers and the trimethacrylates of triols, for example trimethylolpropane, ethoxylated trimethylolpropane having 1 to 20 ethylene oxide units, propoxylated trimethylolpropane having 1 to 20 propylene oxide units, mixed ethoxylated and propoxylated trimethylolpropane, in which the total number of ethylene oxide units and propylene oxide units is from 1 to 20. Examples of other monomeric agents containing three crosslinkable groups are the triacrylates, the trivinyl ethers and the trimethacrylates of glycerol, ethoxylated glycerol having 1 to 20 ethylene oxide units, propoxylated glycerol having 1 to 20 propylene oxide units, and mixed ethoxylated and propoxylated glycerol in which the total number of ethylene oxide units and propylene oxide units is from 1 to 20.

Monomeric agents containing four crosslinkable groups are, for example, the tetraacrylates, the tetravinyl ethers and the tetramethacrylates of tetraols, for example bistrimethylolpropane, ethoxylated bistrimethylolpropane having 1 to 20 ethylene oxide units, propoxylated bistrimethylolpropane having 1 to 20 propylene oxide units, and mixed ethoxylated and propoxylated bistrimethylolpropane in which the total amount of ethylene oxide units and propylene oxide units is from 1 to 20. Other monomeric agents containing four crosslinkable groups are, for example, the tetraacrylates, the tetravinyl ethers and the tetramethacrylates of tetraols, for example pentaerythritol, ethoxylated pentaerythritol having 1 to 20 ethylene oxide units, propoxylated pentaerythritol having 1 to 20 propylene oxide units, and mixed ethoxylated and propoxylated pentaerythritol in which the total amount of ethylene oxide units and propylene oxide units is from 1 to 20.

In order to increase reactivity in the crosslinking or polymerization in air, the binders and monomeric agents can comprise from 0.1 to 10% of a primary or secondary amine. Examples of suitable amines are ethanolamine, diethanolamine and dibutylamine.

The pigment-containing compositions can be prepared by conventional dispersion methods known to the persons skilled in the art using diluents, dispersants, photoinitiators and, if desired, further additives.

Diluents which can be used are water or organic liquids or mixtures thereof, organic liquids being preferred. Particular preference is given to organic liquids having a boiling point of below 140° C., in particular ethers, such as tetrahydrofuran, ketones, such as ethyl methyl ketone, and esters, such as butyl acetate.

Dispersants which can be used are low-molecular-weight dispersants, for example stearic acid, or polymeric dispersants. Suitable polymeric dispersants or dispersion resins are known to the person skilled in the art. Particular mention should be made of polyurethanes containing sulfonate groups, phosphate groups, phosphonate groups or carboxyl groups, vinyl chloride copolymers containing carboxyl groups, and polyimine polyesters and polyether acrylates with or without incorporated functional groups.

Crosslinkable or polymerizable pigment-containing formulations can be prepared using the photoinitiators which are commercially available for photochemical polymerization, for example the photoinitiators listed above for the photochemical polymerization of the cholesteric mixtures.

The layered materials and pigments according to the invention can basically have the following layer sequence:

1) if desired, a first support
2) if desired, a release layer,
3) at least one cholesteric color-effect layer,
4) if desired, a layer which partially or completely absorbs transmitted light,
5) if desired, a second support applied subsequently to the cholesteric layer, for example by lamination.

Preferred supports are known, preferably thermoplastic films made from polyesters, such as polyethylene terephthalate or polyethylene naphthalate, and polyolefins, cellulose triacetate, polycarbonates, polyamides, polyimides, polyamidoimides, polysulfones, aramids or aromatic polyamides. The thickness of the support is preferably from about 5 to 100 µm, in particular from about 10 to 20 µm. The support can have been subjected prior to coating, to corona discharge treatment, plasma treatment, slight adhesion treatment, heat treatment, dust removal treatment or the like. The support preferably has a mean center-line surface roughness of 0.03 μm or less, in particular 0.02 μm or less, particularly preferably 0.01 μm or less. The roughness profile of the surface of the support can be varied by means of fillers added to the layer support during its production. Examples of suitable fillers are oxides and carbonates of Ca, Si and Ti, and organic fine powders of acrylic substances.

The support can also be a metallized film or a preferably polished metal band, which can, for example, also be in the form of a continuous band.

The process for the production of a cholesteric layered material according to the invention is preferably carried out as follows:

a) In a first step, a release layer is applied to a layer support by means of one of the above-mentioned coating devices, dried and cured. The layer thickness of this release layer is from about 0.5 to 20 μm, in particular from about 0.5 to 10 μm, particularly preferably from about 0.5 to 3 μm. The release layer can be a cholesteric layer or a binder-containing layer containing a binder which is cured or crosslinked by known methods. The pourable mixture for the release layer preferably has a viscosity in the range from about 1 to 500 mPas, in particular from about 10 to 100 mPas, measured at 23° C. The mixture is particularly preferably applied to the layer support at a rate of from about 1 to 800 meters per minute, in particular from about 5 to 100 meters per minute. The curing or crosslinking is preferably carried out by electron beam or UV irradiation.

The adhesion of the release layer to the support is at least 1 cN, preferably at least 3 cN, particularly preferably at least 10 cN, which can be set by adjusting the temperature and irradiation intensity during crosslinking. In the case of UV curing, the temperature of the layer to be cured is at least 80° C., preferably at least 90° C., and the irradiation duration is in the range from 5 to 500 ms, at an emitter power of from about 50 to 200 watts/cm.

The setting of high adhesion is associated with two advantages:

interfering diffusion of constituents of the support or release layer into the overlying cholesteric layers does not occur;

after detachment of the cholesteric layers from the release layer remaining on the support, the release layer can be used for further coating operations.

b) A first cholesteric layer containing the desired cholesteric compound or mixture is subsequently applied to the release layer, dried and cured. The coating composition used for the production of the cholesteric layer preferably has a comparable or identical composition to the coating composition of the release layer. The dry layer thickness of this layer is, for example, in the range from about 0.2 to 1 μm, and the minimum layer thickness corresponds to the pitch height.

c) In a next step, a second cholesteric layer is, if desired, applied to the first cholesteric layer, where the layer thickness is set as in b), then dried and cured as in b). The casting operation is preferably carried out analogously to the production of b). Any desired number of further cholesteric layers can be applied analogously in this way.

The curing or crosslinking of the cholesteric layers is preferably carried out under the same conditions as for the release layer. A value results for the adhesion of each of the cholesteric layers to the next lower layer, i.e., for example, the release layer or another cholesteric layer, which is in the range less than 1 cN, preferably in the range from 0.1 to 0.8 cN. The cholesteric layers can thus, surprisingly, easily be separated from the release layer and, where appropriate, from one another. By varying the irradiation intensity and/or temperature, the adhesion of the cholesteric layers to one another can be set as needed.

d) The cholesteric layers can subsequently be detached from the supported layer and processed further.

The detachment of the cholesteric multilayer structure from the first release layer can be carried out, for example, by passing the composite over a deflection roll of small diameter. As a consequence, the crosslinked cholesteric material delaminates from the release layer. Other known methods are also suitable, for example peeling off the layer support via a sharp edge, scratching the surface of the layer package by means of an air knife and subsequently blowing by means of compressed air or a jet of water or steam, ultrasound, mechanical removal, for example by means of a doctor blade, or combinations thereof.

The cholesteric multilayer material, which now has no support, can, if desired, be converted into a multilayer pigment by comminution to the desired particle size. This can be carried out, for example, by grinding in a universal mill. The comminuted pigments can subsequently be classified in order to narrow the particle-size distribution, for example by means of a sieving process.

The color shift stability of the layered materials according to the invention can be determined, for example, as follows:

A piece of coated sample material, for example consisting of layer support, release layer and the cholesteric layer(s) coated thereon, is treated for 15 minutes in a xylene bath warmed to 80° C. and subsequently dried, which can take place, for example, over one hour at approximately 80° C.; the reflection maximum of the sample treated in this way is then determined by known optical methods in comparison to an untreated sample, and the color shift is calculated therefrom. It has been found that the cholesteric layer according to the invention has adequate solvent and heat stability if this color shift measured in this way is at most from about 5 to 10 nm, preferably less than 3 nm. In particular, no visually evident color difference is observed under these conditions in a conventional paint composition containing a cholesteric pigment according to the invention at an application temperature of between 80° C. and 130° C.

The invention is now explained in greater detail with reference to the attached drawings, in which:

FIG. 1 shows a diagrammatic representation of a layer combination according to the invention consisting of a layer support 1, a release layer 2 applied thereto and the cholesteric layers 3 to 8 coated on top.

FIG. 2 shows the measurement of the adhesive strength. A piece of adhesive tape 18 with a length of about 5 cm is fixed to a flat metal plate 17. The adhesive tape 18 used can be any commercially available adhesive tape which gives an adhesive strength, under otherwise identical measurement conditions, of from about 7.3 to 7.9 cN, in particular about 7.6 cN, with a PET reference film. The PET reference film used here is a PET film, type E2R, from Teijin, thickness 9 μm, width 6.35 mm, surface roughness in accordance with DIN 4768: Rz=0.86 μm, in accordance with DIN 4768/1: Ra=0.012 μm, in accordance with EP-B-0 032 710

Figure 2A:
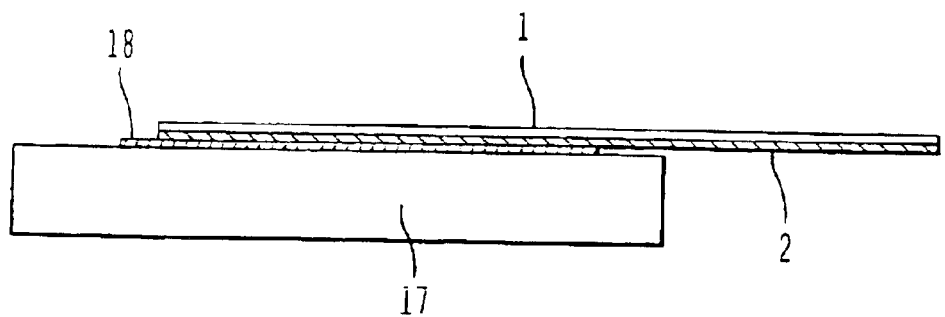
Figure 2B:
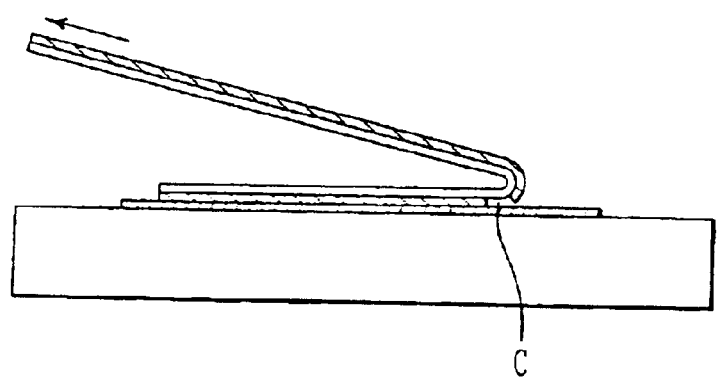
Figure 2C:
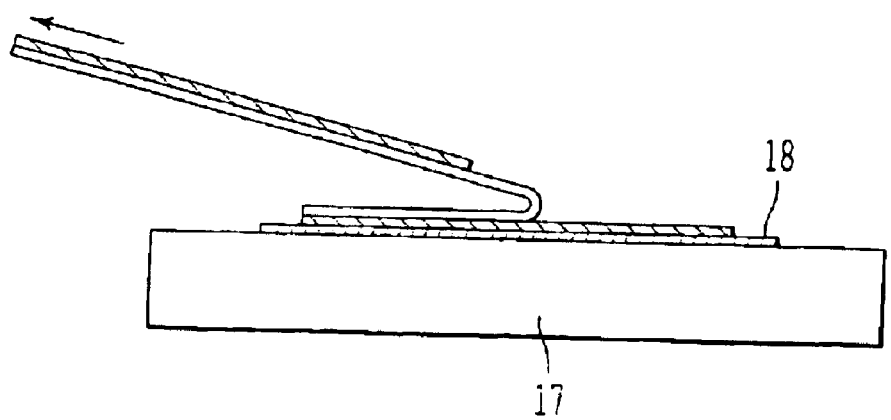
Figure 2D:
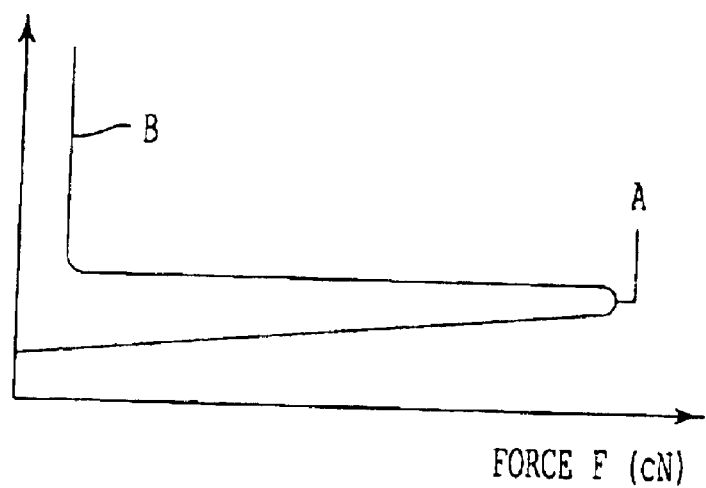

(interference contrast method): from 75 to 125 nm. The adhesive layer faces upward and away from the plate. The composite to be measured, consisting of the layer support 1 and the cholesteric layer 2, is applied in such a way that a cholesteric layer 2 comes into contact with the adhesive layer of the adhesive tape 18, as shown in FIG. 2A. The free end of the composite is then bent up in such a way that it forms an angle of 160° with the plane of the metal plate 17. The free end of the tape is pulled against the stuck end of the tape at a constant rate of 0.1 mm per second in the arrow direction, during which the tensile force in the tape constantly increases until the layer composite tears at point C (FIG. 2B). FIG. 2D shows the change in force, and point A indicates the tear peak of the layer composite. During the remainder of the measurement, the adhesive strength of the cholesteric layer 2 to the support 1 is measured, as shown in FIG. 2C. In the force diagram in FIG. 2D, point B denotes the adhesive strength of the cholesteric layer to the support.

The tensile stresses in the layer composite are recorded using a high-resolution sensor and plotted as peel force in cN using a y-T plotter.

Figure 3:
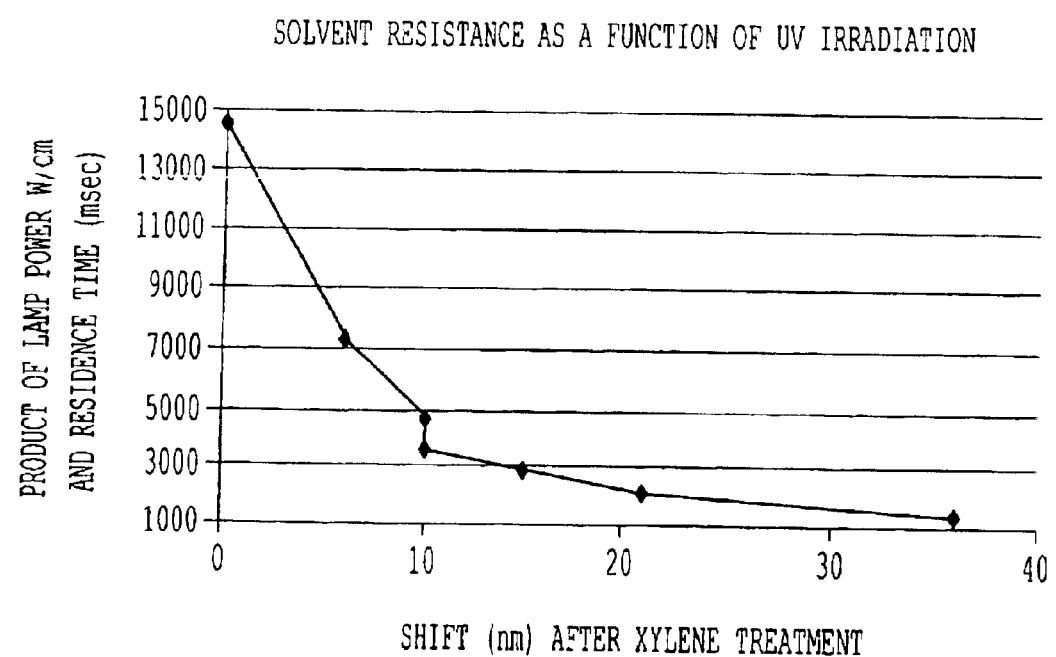

FIG. 3 shows the correlation between color shift and various curing conditions.

EXAMPLE 1

Production of Cholesteric Layered Material a) Production of Cholesteric Release Layer With the aid of a coating device as described in greater detail in the German application with the file reference 19738369.6, a mixture consisting of 45 parts of cholesteric mixture (93.2% of nematic component of the formula (K,n=4) and 3.7% of chiral component of the formula (D), 3 parts of the photoinitiator Irgacure® 907 (from Ciba-Geigy), 0.1 part of Byk 361 (from Byk) and 55 parts of methyl ethyl ketone) is applied to a polyester film with a thickness of 15 μm at a coating rate of 10 m/min. The ready-to-cast mixture had a viscosity of 6 mPas. The coated film is then passed through a drying tunnel held at a temperature of 65° C. The physically dried layer is subsequently cured in-line by irradiation with UV light for an exposure time of 120 ms under a nitrogen atmosphere. To this end, the layer composite is passed with the support layer on a roll held at a temperature of 95° C., opposite which is arranged on part of the periphery a commercially available UV irradiation device (lamp power 120 watts/min). The coated film is wound onto a spool. The cholesteric layer has a thickness of 3 μm and reflects light perpendicular to the layer plane with a reflection peak at a wavelength of 505 nm. Observed with the eye, the layer appears green on a black background when viewed perpendicularly, with a color change to blue when viewed at an angle to the layer. Adhesive strength to the support>7.6 cN.

b) Production of the First Cholesteric Overcoating

The procedure was analogous to that described under a), but 80 parts of methyl ethyl ketone were added to the cholesteric mixture. The viscosity was then 3 mPas, measured at 23° C. The coating rate was 20 m/min; the coating solution was applied to the release layer in such a way that the dry layer thickness was 0.8 μm. The drying and curing conditions were as in the production of the support layer. Adhesive strength to release layer=0.8 cN.

c) Production of the Second Cholesteric Overcoating

The procedure was as under b) for all parameters, with the layer produced in this way being applied to the first cholesteric layer. Adhesive strength to the 1st cholesteric layer=1.5 cN.

EXAMPLE 2

Production of a Cholesteric Effect Pigment a) Removal of the Two-layer Composite from the Support Film The supported two-layer composite produced in accordance with Example 1 is removed from the polyester support film by damaging the composite transversely to the film web direction using a razor blade and then blowing with compressed air forced through a slot nozzle, while the coated film is transported continuously past the slot nozzle and the two-layer composite blown off is collected in the form of flakes. The two-layer flakes have a thickness of 1.6 μm and exhibit a strong green color on both sides when viewed perpendicularly with a color change to blue when viewed at an angle to the flakes.

b) Grinding of the Two-layer Flakes to Give a Pigment 10 g of cholesteric flakes produced as described under a) are mixed with 100 g of sodium chloride and ground 6 times for 2 minutes in a impact knife mill. After grinding, the salt is washed out with water and the pigment is isolated. Since the mutual adhesion of the two-layer composite is relatively low, the pigment prepared in this way has a thickness of 800 nm after the grinding operation and exhibits excellent brightness.

EXAMPLE 3

The procedure was as in Example 1, but only one cholesteric layer was applied to the release layer (adhesive strength 0.6 cN).

EXAMPLE 4

The procedure was as in Example 1, but 5 cholesteric layers were applied one after the other (adhesive strength of the five layers to one another 0.6 cN).

EXAMPLE 5

The procedure was as in Example 3, but the cholesteric layer was applied in a dry layer thickness of 3.5 μm (adhesive strength 0.8 cN).

Comparative Example 1

The procedure was as in Example 3, but the crosslinking of the cholesteric layer was carried out at 23° C.

Comparative Example 2

The procedure was as in Example 3, but the crosslinking of the cholesteric layer was carried out at 60° C.

The following table shows the result of layer samples obtained in accordance with the examples and comparative examples with respect to color shift by the xylene test and brightness.

The adhesion values indicated in each case above relate to the adhesion of the cholesteric layer to the support layer. The adhesion of the support layer to the layer support was greater than 8.6 cN in all examples and comparative examples.

TABLE 1

| Sample from | Brightness | Color shift |
|---|---|---|
| Example 1 (release layer) | good | −1 nm |
| Example 3 | good | −1 nm |
| Example 4 | good | −4 nm |
| Example 5 | poor | −1 nm |

TABLE 1-continued

| Sample from | Brightness | Color shift |
|---|---|---|
| Comp. Ex. 1 | good | −22 nm |
| Comp. Ex. 2 | good | −19 nm |

If, analogously to Examples 1 to 4, the UV curing temperatures were 100° C. instead of 90° C., very good results with respect to adhesion, i.e. detachment of the cholesteric layer(s) from the release layer, and brightness and color shift were likewise achieved.

EXAMPLE 6

100 g of a nematic compound of the formula (K,n=4) were stirred with 3.25 g of a chiral compound of the formula (D), 103.25 g of tetrahydrofuran, 5 g of a 1% strength solution of Byk 361 in tetrahydrofuran and 2 g of Irgacure 184 to a give a clear solution. This mixture was coated onto a PET layer support with a thickness of 14 μm in a dry layer thickness of 2.5 μm using a knife coater at an excess coating pressure of 0.2 bar. The residence time in the drying zone following the coating device was 24 s at 85° C. The casting rate was 10 m/min. The crosslinking was carried out using a UV lamp with a power of 120 W/cm at 100° C. under a nitrogen atmosphere.

The layer obtained in this way gave a bright dark-red impression on a black background with a strong angle dependence to black when viewed at an angle.

Comparative Example 3a

The procedure was as in Example 6, but the temperature during the crosslinking was 60° C.

Comparative Example 3b

The procedure was as in Example 6, but the crosslinking temperature was 25° C.

In order to check the solvent resistance of the crosslinked layers, one test strip in each case having an area of 2×5 cm was bathed in a xylene solution heated to 80° C. over a period of 15 minutes, subsequently dried at 80° C. for 60 minutes and measured for color changes in a commercially available spectrometer. The results obtained are shown in Table 2. In addition, the adhesive strength of the cholesteric layers to the layer support were measured.

TABLE 2

| | Reflection maximum before treatment | Reflection maximum after treatment | Adhesive strength |
|---|---|---|---|
| Example 6 | 721 nm | 721 nm | >8 cN |
| Comp. Ex. 3a | 715 nm | 703 nm | 0.7 cN |
| Comp. Ex. 3b | 718 nm | 671 nm | 0.3 cN |

EXAMPLE 7

100 g of a nematic compound of the formula (K,n=4) were stirred with 4 g of a chiral compound of the formula (D), 104 g of tetrahydrofuran, 5 g of a 1% strength solution of Byk 361 in tetrahydrofuran and 2 g of Irgacure 184 to give a clear solution. This mixture was coated onto a PET layer support having a thickness of 14 μm in a dry layer thickness of 2.5 μm using a knife coater at an excess coating pressure of 0.2 bar. The residence time in the drying zone following the coating device was 24 s at 85° C. The coating rate was 10 m/min. The crosslinking was carried out using a UV lamp with a power of 120 W/cm at 100° C. under a nitrogen atmosphere.

The layer obtained in this way gave a bright green impression on a black background with a strong angle dependence to blue when viewed at an angle.

Comparative Example 4a

The procedure was as in Example 7, but the temperature during the crosslinking was 60° C.

Comparative Example 4b

The procedure was as in Example 7, but the crosslinking temperature was 25° C.

In order to check the solvent resistance of the crosslinked layers, one test strip in each case having an area of 2×5 cm was bathed in a xylene solution heated to 80° C. over a period of 15 minutes, subsequently dried at 80° C for 60 minutes and measured for color changes in a commercially available spectrometer. The results obtained are shown in Table 3. In addition, the adhesive strength of the cholesteric layers to the layer support were measured.

TABLE 3

| | Measurement before treatment | Measurement after treatment | Adhesive strength |
|---|---|---|---|
| Example 7 | 524 nm | 523 nm | >8 cN |
| Comp. Ex. 4a | 525 nm | 519 nm | 0.6 cN |
| Comp. Ex. 4b | 525 nm | 506 nm | 0.3 cN |

EXAMPLE 8

Initially, the procedure was as in Example 6, a second cholesteric layer of identical composition and thickness was then applied to the resultant layer, likewise described in Example 6. Since the 1st layer, as shown in Example 6, is very solvent-resistant, the 1st layer is not partially dissolved on casting of the 2nd layer, which is reflected in low adhesion of the 2nd layer to the 1st layer (cf. Table 4).

TABLE 4

| | Layer thickness | Adhesive strength |
|---|---|---|
| 2nd cholesteric layer | 2.5 μm | 0.4 cN |
| 1st cholesteric layer | 2.5 μm | >8 cN |
| PET layer support | 14 μm | |

Comparative Example 5

The procedure was as in Example 8, but the 1st cholesteric layer was UV-cured at 60°. The adhesive strengths obtained with this layer composite are shown in Table 5.

TABLE 5

| | Layer thickness | Adhesive strength |
|---|---|---|
| 2nd cholesteric layer | 2.5 μm | 2.3 cN |
| 1st cholesteric layer | 2.5 μm | 0.7 cN |
| PET support layer | 14 μm | |

Owing to the increased adhesive strength of the 2nd layer to the 1st layer, the two can only be separated from the layer support together. The detached layer composite exhibits only a moderate degree of delamination after the grinding operation described above, ie. an increased number of coherent two-layer flakes are observed on microscopic observation of the composite.

EXAMPLE 9

The cholesteric layers obtained in accordance with Example 8 and Comparative Examples 3a, 3b, 4a and 4b were separated from the layer support by means of an airknife and in each case ground to give pigments having a flake size of 35 µm. These pigments were incorporated into a spray formulation consisting of a melamine-crosslinked CAB-containing baking enamel having a solids content of 20% and a solvent content of 80%, consisting of a mixture of xylene, butyl acetate and ethyl acetate. The mixture was sprayed onto a black sample sheet in a dry layer thickness of 25 µm, the pigment concentration in each case being 4%. The coatings were then subjected to baking temperatures of 80, 130 and 160° C. for a baking time of 30 minutes in each case. Table 6 below shows the wavelength changes which occur during this operation, which are measured using a commercially available spectrometer.
(CAB=cellulose acetate butyrate)

TABLE 6

| Sample | Changes in wavelength at baking temperature | |
|---|---|---|
| | 80° C. to 130° C. | 80° C. to 160° C. |
| Example 8 | 0 nm | 0 nm |
| Comp. Ex. 3a | −4 nm | −4 nm |
| Comp. Ex. 3b | −10 nm | −10 nm |
| Comp. Ex. 4a | −3 nm | −4 nm |
| Comp. Ex. 4b | −13 nm | −13 nm |

EXAMPLE 10
Investigation of the Effect of the Radiation Duration and Radiation Power on the Color Shift Stability Layers having thickness in the region of 1 µm can be coated at an advantageously high coating rate. This also causes the residence time in the curing zone to decrease. The effect of an increased coating rate, under otherwise identical conditions, on the color shift stability of the resultant cholesteric layers is to be investigated in the following experimental series. In addition, it is to be tested whether a change in the radiation power can likewise affect the color shift stability.

In order to carry out the experimental series, a coating composition of the following composition is prepared:
  9.55 g of the nematic compound of formula (H)
  23.33 g of THF, NaOE dried
  0.45 g of the twisting component of the formula (B)
  0.10 g of Byk 361, 10% strength in THF
  0.20 g of Irgacure 184

The coating is carrried out for batches A, B, C, D, D1, D2 and D3 at the coating rates and lamp power values indicated in Table 7 under otherwise identical conditions (open caster, 3 µm gap width, support film Teijin K7, thickness 14 µm, drying temperature 85° C., temperature of the UV roll 100° C., lamp power 100%=120 watts/cm). The supported cholesteric layers obtained in this way are used to carry out the xylene test described above after determination of the layer thickness. In addition, the percentage reflection and the reflection maximum are determined before and after the xylene treatment. The results determined here are shown in Table 8 below. In addition, the change in the reflection maximum and the adhesive strength of the cholesteric layer to the support are determined, the latter as a spot test. The results obtained are shown in Table 9. In addition, Table 9 indicates the residence time in the UV curing region for each experimental batch.

A mathematical correlation can be determined from the indicated color shift values and the pro duct of the lamp power (in watts/cm) and the residence time UV (in ms). The correlation between the two parameters is shown in FIG. 3. In addition, it can be seen that deliberate increase in the product of the lamp power and residence time allows the color shift stability of cholesteric layers and consequently of the pigments prepared from the layers to be improved in a targeted manner.

TABLE 7

| Experiment number | coating rate | Lamp power |
|---|---|---|
| A | 10 m/min | 100% |
| B | 20 m/min | 100% |
| C | 30 m/min | 100% |
| D | 40 m/min | 100% |
| D1 | 40 m/min | 80% |
| D2 | 40 m/min | 60% |
| D3 | 40 m/min | 40% |

TABLE 8

| Number | coating rate | Lamp power | Δ reflection maximum after xylene treatment [nm] |
|---|---|---|---|
| A | 10 m/min | 100% | +1 |
| B | 20 m/min | 100% | −6 |
| C | 30 m/min | 100% | −10 |
| D | 40 m/min | 100% | −10 |
| D1 | 40 m/min | 80% | −15 |
| D2 | 40 m/min | 60% | −21 |
| D3 | 40 m/min | 40% | −38 |

TABLE 9

| Number | coating rate/ residence time UV | Lamp power | Δ refl. max. (nm) | Adhesion (cN) |
|---|---|---|---|---|
| A | 10 m/min/120 msec | 100%/120 W/cm | +1 | >7.5 |
| B | 20 m/min/60 msec | 100%/120 W/cm | −6 | |
| C | 30 m/min/40 msec | 100%/120 W/cm | −10 | |
| D | 40 m/min/30 msec | 100%/120 W/cm | −10 | 3.7 |
| D1 | 40 m/min/30 msec | 80%/96 W/cm | −15 | |
| D2 | 40 m/min/30 msec | 60%/72 W/cm | −21 | |
| D3 | 40 m/min/30 msec | 40%/48 W/cm | −36 | 0 |

What is claimed is:

1. A cholesteric layered material comprising at least one three-dimensionally crosslinked, aligned cholesteric layer, wherein the crosslinked cholesteric layer(s) does (do) not exhibit any color shift which can be induced by external stimuli selected from the group consisting of changes in the temperature of the layered material, the action of diluents on the layered material, and combinations thereof.

2. A cholesteric layered material comprising at least one three-dimensionally crosslinked, aligned cholesteric layer, wherein the crosslinked cholesteric layer(s) does (do) not exhibit any color shift which can be induced by external stimuli selected from the group consisting of
    a) a change in the temperature in the range from −30° C. to 250° C.;
    b) warming to temperatures in the range from 80 to 160° C. with simultaneous exposure to a diluent; and c) treatment for 15 minutes at 80° C. in xylene followed by drying.

3. The cholesteric layered material as claimed in claim 2, wherein the external stimuli comprises treatment in xylene, and wherein the reflection maximum of the cholesteric layer after the xylene treatment can be shifted by not more than about 10 nm into the higher or lower wavelength region.

4. The cholesteric layered material as claimed in claim 1, wherein, the cholesteric layer has a mean dry layer thickness of less than about 5 $\mu$m.

5. The cholesteric layered material as claimed in claim 1, wherein the cholesteric layer has a mean dry layer thickness of at least one pitch height.

6. The cholesteric layered material as claimed in claim 1, which comprises a plurality of color shift-stable cholesteric layers of identical or different thickness and identical or different chemical composition.

7. A cholesteric pigment comprising at least one three-dimensionally crosslinked, aligned cholesteric layer having a mean particle size in the range from 5 to 50 $\mu$m and a thickness of from 0.2 to 5 $\mu$m, wherein the at least one crosslinked cholesteric layer exhibits no visually evident color shift.

8. A process for the production of a cholesteric layered material as claimed in claim 1, which comprises:
   a) casting and simultaneous alignment of a cholesteric coating composition comprising at least one crosslinkable substance onto a support with formation of a first cholesteric layer, where the support is essentially chemically inert to the cholesteric layer to be applied;
   b) drying and crosslinking of the applied layer, where the conditions are selected in such a way that the resultant layer exhibits no visually evident color shift;
   c) removing the layered material from the support after one or more further aligned cholesteric layers have, if desired, been applied to the layer obtained in accordance with step a).

9. The process as claimed in claim 8, wherein a support is employed which does not adversely affect the alignment of the cholesteric layer cast thereon during drying and curing.

10. The process as claimed in claim 8, wherein the support has an adhesive strength of less than about 1 cN to the dried and crosslinked first cholesteric layer cast thereon.

11. The process as claimed in claim 8, wherein a layered material comprising a plurality of cholesteric layers is produced, where the second layer can be removed selectively from the first layer on the support as a composite with any further layers.

12. The process as claimed in claim 8, wherein the support is selected from the group consisting of a plastic support, a metal support, a glass support, and a ceramic support.

13. The process as claimed in claim 12, wherein the plastic support comprises a release layer of crosslinked, optionally aligned, cholesteric material onto which the first cholesteric layer is cast.

14. The process as claimed in claim 13, wherein the adhesion between the plastic support and the release layer is at least about twice the adhesion between release layer and first cholesteric layer.

15. The process as claimed in claim 8, wherein the coating compositions for the cholesteric layer(s) and the release layer independently of one another have a viscosity in the range from about 1 to 50 mPas, and the coating rate is in the range from about 1 to 800 m/min.

16. The process as claimed in claim 8, wherein the crosslinking of the cholesteric layer(s) and of any cholesteric release layer present is carried out by electron beams or UV radiation with simultaneous warming of the layer 25 to be cured, where the emitter power is in the range from about 50 to 200 watts/cm.

17. The process as claimed in claim 16, wherein the layer temperature during the radiation curing is at least 60° C.

18. The process as claimed in claim 8, wherein a further support film is applied to the cholesteric layer applied last, and the one or more cholesteric layer(s) is (are) removed from the support as a composite.

19. The process as claimed in claim 8, wherein one or more cholesteric layer(s) is (are) removed from the support by blasting with compressed air, a water jet, steam or with the aid of a knife coater and ground to give pigments.

20. A composition comprising at least one cholesteric pigment as claimed in claim 7 and one or more additional components.

21. A polarizer comprising a layered material as claimed in claim 1, which is, optionally applied to a support film.

22. A broad-band polarizer comprising a layered material as claimed in claim 1 having a number of from 3 to 20 cholesteric layers with reflection maxima matched to one another, where the polarizer has a total thickness without support film in the range from about 2 to 50 $\mu$m.

23. The cholesteric layered material as claimed in claim 3, wherein the cholesteric layer has a mean dry layer thickness of less than about 2 $\mu$m.

24. The cholesteric layer material as claimed in claim 3, wherein the cholesteric layer has a mean dry layer thickness of less than or equal to about 1 $\mu$m.

25. The process as claimed in claim 17, wherein the layer temperature during radiation curing is at least 8° C.

26. The process as claimed in claim 17, wherein the layer temperature during radiation curing is at least 90° C.

27. A method of making an article comprising incorporating the cholesteric layered material as claimed in claim 1 into and/or onto the article.

28. The method as claimed in claim 27, wherein the article is selected from the group consisting of a motor vehicle, a motor vehicle accessory, a computer, a leisure article, a sport article, a toy article, an optical article, a cosmetic article, a textile article, a leather article, a jewelry article, a writing article, a spectacle frame, a construction article, a print article, and a paint article.

29. The method as claimed in claim 28, wherein the article is a motor vehicle and the cholesteric layered material is painted onto the motor vehicle.

30. A method of making an article comprising incorporating the composition as claimed in claim 7 into and/or onto the article.

31. The method as claimed in claim 29, wherein the article is selected from the group consisting of a motor vehicle, a motor vehicle accessory, a computer, a leisure article, a sport article, a toy article, an optical article, a cosmetic article, a textile article, a leather article, a jewelry article, a writing article, a spectacle frame, a construction article, a print article, and a paint article.

32. The method as claimed in claim 31, wherein the article is a motor vehicle and the cholesteric layered material is painted onto the motor vehicle.

* * * * *